(12) United States Patent
Gabayan et al.

(10) Patent No.: US 9,009,516 B1
(45) Date of Patent: Apr. 14, 2015

(54) ADJUSTING A POWER MODE OF A WEARABLE COMPUTING DEVICE BASED ON MOTION DATA

(71) Applicant: Google Inc., Mountain View, CA (US)

(72) Inventors: Kevin Gabayan, Santa Clara, CA (US); William Haldean Brown, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/295,295

(22) Filed: Jun. 3, 2014

Related U.S. Application Data

(60) Provisional application No. 61/942,006, filed on Feb. 19, 2014, provisional application No. 61/973,786, filed on Apr. 1, 2014.

(51) Int. Cl.
| | |
|---|---|
| *G06F 1/00* | (2006.01) |
| *G06F 1/26* | (2006.01) |
| *G06F 1/32* | (2006.01) |
| *G01R 31/00* | (2006.01) |
| *G01P 15/00* | (2006.01) |
| *G01C 9/00* | (2006.01) |
| *G01C 19/00* | (2013.01) |
| *G01P 15/16* | (2013.01) |
| *G01P 3/44* | (2006.01) |
| *G01P 15/18* | (2013.01) |

(52) U.S. Cl.
CPC .............. *G06F 1/3206* (2013.01); *G01P 15/003* (2013.01); *G06F 1/26* (2013.01); *G01P 15/165* (2013.01); *G06F 1/3265* (2013.01); *G01P 3/44* (2013.01); *G06F 1/3231* (2013.01); *G01P 15/18* (2013.01)

(58) Field of Classification Search
None
See application file for complete search history.

(56) References Cited

U.S. PATENT DOCUMENTS

| | | | |
|---|---|---|---|
| 6,874,127 B2 | 3/2005 | Newell et al. | |
| 7,180,502 B2 * | 2/2007 | Marvit et al. | 345/156 |
| 7,184,025 B2 * | 2/2007 | Williams et al. | 345/169 |
| 8,344,998 B2 | 1/2013 | Fitzgerald et al. | |
| 8,515,505 B1 | 8/2013 | Pattikonda | |
| 8,784,271 B2 | 7/2014 | Brumback et al. | |

(Continued)

OTHER PUBLICATIONS

Fareastgizmos, Casio G-Shock with High Brightness LED Automatically Illuminates the Display When the User Tilts the Watch Toward the Eyes to Check the Time—Fareastgizmos, 3 pages, downloaded from fareastgizmos.com, downloaded on Jan. 7, 2014.

(Continued)

*Primary Examiner* — Ji H Bae
(74) *Attorney, Agent, or Firm* — Shumaker & Sieffert, P.A.

(57) ABSTRACT

In one example, a method includes determining, based on motion data generated by a motion sensor of a wearable computing device, a plurality of motion vectors, wherein one or more components operatively coupled to the wearable computing device are operating in a first power mode during a first time period; determining, based on the plurality of motion vectors, a plurality of values. In this example, the method also includes, responsive to determining that each of the plurality of values satisfies a corresponding threshold, transitioning, by at least one component of the one or more components, from operating in the first power mode to operating in a second power mode.

34 Claims, 7 Drawing Sheets

(56) References Cited

U.S. PATENT DOCUMENTS

| | | | |
|---|---|---|---|
| 2008/0255795 A1* | 10/2008 | Shkolnikov | 702/141 |
| 2009/0265671 A1 | 10/2009 | Sachs et al. | |
| 2011/0177802 A1 | 7/2011 | Gupta | |
| 2012/0254646 A1* | 10/2012 | Lin | 713/323 |
| 2012/0297226 A1* | 11/2012 | Mucignat et al. | 713/323 |
| 2013/0222270 A1 | 8/2013 | Winkler et al. | |
| 2013/0222271 A1 | 8/2013 | Alberth et al. | |
| 2013/0249785 A1 | 9/2013 | Alameh | |
| 2013/0300687 A1* | 11/2013 | Park | 345/173 |

OTHER PUBLICATIONS

Introducing the Meteor Your Voice and Gesture-Controlled Smartwatch, Two-Way Voice & Gesture Control Communicator, Kreyos—The Meteor smart watch, downloaded from https://kreyos.com/, downloaded on Jun. 3, 2014, 8 pages.

Shanklin, "Review: Pebble Smartwatch", www.gizmag.com/pebble-watch-review/28990, Sep. 8, 2013, 11 pages, downloaded on Jan. 7, 2014.

* cited by examiner

ADJUSTING A POWER MODE OF A WEARABLE COMPUTING DEVICE BASED ON MOTION DATA

RELATED APPLICATION

This application claims the benefit of U.S. Provisional Application No. 61/942,006, filed Feb. 19, 2014, and U.S. Provisional Application No. 61/973,786, filed Apr. 1, 2014 the entire contents of each of which are hereby incorporated by reference.

BACKGROUND

Mobile computing devices allow a user to perform a variety of functions (including various forms of communication and computing) on a portable device that can be used in a wide variety of settings and contexts. For example, some mobile devices are capable of accessing the Internet, executing gaming applications, playing videos and music, as well as providing functionality of a traditional mobile (e.g., cellular) telephone. Some such mobile computing devices can be wearable by a user (e.g., by attachment and/or coupling to the user's body and/or clothing). Because such devices are generally powered by a small rechargeable battery, a persistent challenge in wearable mobile computing device ("wearable computing device") design is increasing the length of time that the wearable computing device may operate without recharging the battery.

One method for increasing the length of time that a wearable computing device may operate without recharging the battery is to reduce the amount of power consumed by one or more components of the wearable computing device. A significant consumer of power in a typical wearable computing device is a presence-sensitive display (included in and/or operatively coupled to the wearable computing device) that detects user input and displays graphical content. One example of a presence-sensitive display may be a touchscreen that is physically integrated within a smartphone, tablet, wearable, or other computing device. While the presence-sensitive display is powered on, the wearable computing device may receive indications of user input that are detected at the presence-sensitive display and output graphical content for display at the presence-sensitive display. Wearable computing devices may include a physical button that, when depressed by a user, causes the computing device to power on and/or power off the presence-sensitive display. To conserve power, some wearable computing devices may also automatically power off the presence-sensitive display after a defined time duration during which the presence-sensitive display does not detect user input.

While various options may exist to power off the presence-sensitive display—such as a physical power button and time-based automatic power off—fewer options are available to power on a presence-sensitive display. For instance, a user may need to locate and select a physical power button to power on the presence-sensitive display, which requires an additional user input before interacting with the presence-sensitive display. Alternatively, some wearable computing devices may power on the presence-sensitive display in response to a change in motion of the wearable computing device that was previously at rest. However, such techniques may produce false positives that power on the presence-sensitive display when not intended by the user, thereby further exacerbating the amount of battery life consumed by the presence-sensitive display and thus decreasing the overall battery life of the mobile computing device.

SUMMARY

In one example, a method includes determining, by a processor of a wearable computing device and based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period. In this example, the method also includes determining, by the processor, that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time. In this example, the method also includes determining, by the processor, that a time difference between the first time and the second time satisfies a threshold amount of time, and determining, by the processor, that a second angle between a plane parallel to a display of the wearable computing device and a plane perpendicular to a gravity vector satisfies a second angular threshold. In this example, the method also includes responsive to determining that the first angle satisfies the first angular threshold, that the time difference satisfies the threshold amount of time, and that the second angle satisfies the second angular threshold, transitioning, by at least one component of the one or more components, from operating in the first power mode to operating in a second power mode, wherein the at least one component consumes more power while operating in the second power mode than while operating in the first power mode.

In another example, a wearable computing device includes a plurality of processors including: a first motion processor; and an application processor; a motion sensor; a display; and at least one module executable by at least one of the plurality of processors. In this example, the at least one module is executable by the at least one of the plurality of processors to determine, based on motion data generated by the motion sensor, a plurality of motion vectors, wherein one or more components of the wearable computing device are operating in a first power mode during a first time period, and wherein the motion data indicates movement of the wearable computing device during the first time period. In this example, the at least one module is also executable by the at least one of the plurality of processors to determine that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time. In this example, the at least one module is also executable by the at least one of the plurality of processors to determine that a time difference between the first time and the second time satisfies a threshold amount of time, and determine that a second angle between a plane parallel to the display and a plane perpendicular to a gravity vector satisfies a second angular threshold. In this example, the at least one module is also executable by the at least one of the plurality of processors to, responsive to determining that the first angle satisfies the first angular threshold, that the time difference satisfies the threshold amount of time, and that the second angle satisfies the second angular threshold, cause at least one component of the one or more components to transition, from operating in the first power mode to operating in a second power mode, wherein the at least one component consumes more power while operating in the second power mode than while operating in the first power mode.

In another example, a non-transitory computer-readable storage medium stores instructions that, when executed, cause at least one processor of a plurality of processors of a wearable computing device to: determine, based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period. In this example, the non-transitory computer-readable storage medium also stores instructions that cause the at least one processor to determine that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time. In this example, the non-transitory computer-readable storage medium also stores instructions that cause the at least one processor to determine that a time difference between the first time and the second time satisfies a threshold amount of time, and determine that a second angle between a plane parallel to a display of the wearable computing device and a plane perpendicular to a gravity vector satisfies a second angular threshold. In this example, the non-transitory computer-readable storage medium also stores instructions that cause the at least one processor to, responsive to determining that the first angle satisfies the first angular threshold, that the time difference satisfies the threshold amount of time, and that the second angle satisfies the second angular threshold, at least one component of the one or more components to transition, from operating in the first power mode to operating in a second power mode, wherein the at least one component consumes more power while operating in the second power mode than while operating in the first power mode.

In yet another example, a wearable computing device includes means for determining, based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period. In this example, the wearable computing device also includes means for determining that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time. In this example, the wearable computing device also includes means for determining that a time difference between the first time and the second time satisfies a threshold amount of time, and means for determining that a second angle between a plane parallel to a display of the wearable computing device and a plane perpendicular to a gravity vector satisfies a second angular threshold. In this example, the wearable computing device also includes means for transitioning, responsive to determining that the first angle satisfies the first angular threshold, that the time difference satisfies the threshold amount of time, and that the second angle satisfies the second angular threshold, by at least one component of the one or more components, from operating in the first power mode to operating in a second power mode, wherein the at least one component consumes more power while operating in the second power mode than while operating in the first power mode.

In yet another example, a method includes determining, by a processor of a wearable computing device and based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period. In this example, the method also includes responsive to determining, by the processor, that a first energy value based on a first subset of the plurality of motion vectors satisfies a first energy threshold, determining that a particular motion vector from the first subset is a starting motion vector. In this example, the method also includes, responsive to determining, by the processor, that a second energy value based on a second subset of the plurality of motion vectors satisfies a second energy threshold, determining that a particular motion vector from the second subset is an ending motion vector, wherein the first subset includes at least one motion vector from the plurality of motion vectors not included in the second subset, and wherein the second subset includes at least one motion vector from the plurality of motion vectors not included in the first subset. In this example, the method also includes responsive to determining, by the processor, that a difference between the first motion vector and the second motion vector indicates that a user of the wearable computing device is viewing the wearable computing device, transitioning, by at least one component of the one or more components, from operating in the first power mode to operating in a second power mode, wherein the at least one component consumes more power while operating in the second power mode than while operating in the first power mode.

The details of one or more examples of the disclosure are set forth in the accompanying drawings and the description below. Other features, objects, and advantages will be apparent from the description and drawings, and from the claims.

DETAILED DESCRIPTION

Figure 1:
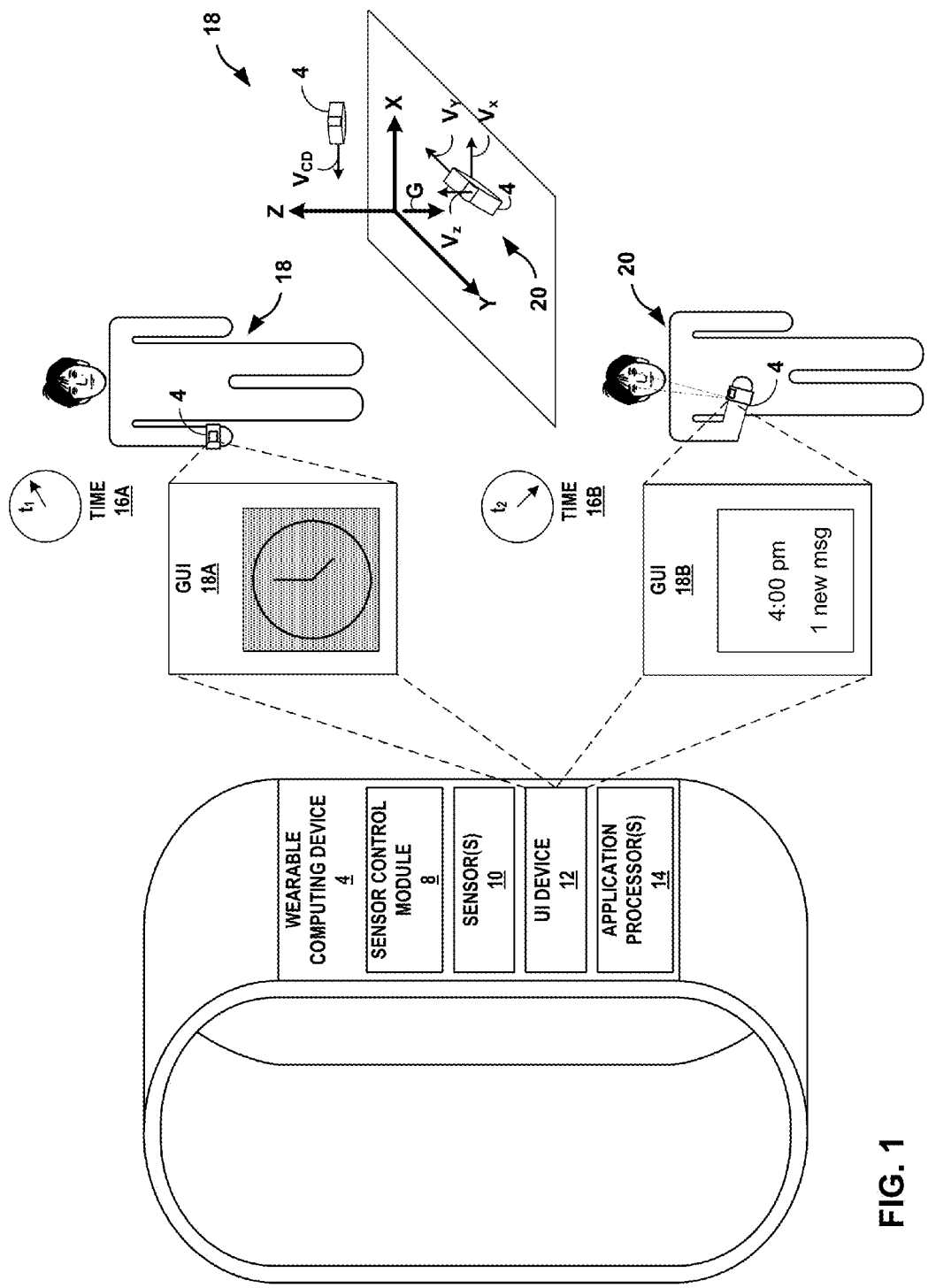
FIG. 1 is a block diagram illustrating an example wearable computing device that transitions between power modes based on motion data, in accordance with one or more techniques of the present disclosure.

In general, techniques of the disclosure are directed to a wearable computing device that transitions between power modes in response to determining that a user is likely viewing a display operatively coupled to or included in the wearable computing device. For instance, an application processor and/or a display of a wearable computing device worn on a wrist of a user may be operating in a low-power mode. Responsive to determining, based on motion data generated by a motion sensor of the wearable computing device, that the user has performed a gesture associated with moving the wearable computing device into position in which the user is likely able to view the display, one or more components of the wearable computing device may transition from operating in a lower-power mode to operating in a higher-power mode.

In some examples, the wearable computing device may determine that the user has performed the gesture based on a determination that a plurality of values, based on motion data corresponding to movement of the wearable computing device, each satisfies a corresponding threshold. In some examples, the wearable computing device may determine when to evaluate the values based on an energy value derived from motion data generated based on motion of the wearable computing device. For instance, where the energy value satisfies an energy threshold at a first time, and does not satisfy the energy threshold at a second, later, time, the wearable computing device may determine the values based on motion data associated with the first time and motion data associated with the second time.

The plurality of values may include a gesture duration value, an ending orientation value, and a sweep angle value. In some examples, the gesture duration value may satisfy a gesture duration threshold where a time difference between the first time and the second time is greater than a minimum gesture duration. In some examples, the ending orientation value may satisfy an orientation threshold where, at the second time, the orientation of the wearable computing device indicates that it is possible for the user to view a display of the wearable computing device. In some examples, the swept angle value may satisfy an angular threshold where an angle between a motion vector of the computing device at the first time and a motion vector of the computing device at the second time is greater than a minimum swept angular threshold.

Rather than determining that the user is attempting to view the wearable computing device based on a single value and a single threshold (which may result in a high number of false positives), techniques of the disclosure may enable a wearable computing device to determine whether or not the user is attempting to view a display device included in and/or operatively coupled to the wearable computing device based on a plurality of values and thresholds. As such, the techniques may reduce the number of instances in which one or more components of the wearable computing device are inordinately powered on and, therefore, reduce the amount of power consumed by the wearable computing device.

FIG. 1 is a block diagram illustrating an example wearable computing device that is configured to detect activity transitions, in accordance with one or more techniques of the present disclosure. As shown in the example of FIG. 1, wearable computing device 4 may include motion module 6, sensor control module 8 ("SCM 8"), one or more sensors 10, user interface device 12 ("UID 12"), and one or more application processors 14.

Wearable computing device 4 may include any number of different portable electronic computing devices, but not limited to, smart watches, smart glasses, headsets, mobile phones (including smartphones), tablet computers, cameras, personal digital assistants (PDAs), etc. Wearable computing device 4 may include various input and output components, including, e.g. one or more processors, memory, telemetry modules, cellular network antennas, a display, one or more UI elements, sensors, and a power source like a rechargeable battery. Further details of wearable computing device 4 are described in FIG. 2. Other examples of wearable computing device 4 that implement techniques of this disclosure may include additional components not shown in FIG. 1.

In some examples, wearable computing device 4 may include SCM 8. SCM 8 may communicate with one or more of sensors 10. In some examples, SCM 8 may be referred to as a "sensor hub" that operates as an input/output controller for one or more of sensors 10. For example, SCM 8 may exchange data with one or more of sensors 10, such as motion data corresponding to wearable computing device 4. SCM 8 may also communicate with application processors 14. In some examples, SCM 8 may use less power than application processors 14. As one example, in operation, SCM 8 may use power in a range of 20-200 mW. In some examples, SCM 8 may be referred to as a digital signal processor (DSP) that operates as an input/output controller for one or more of sensors 10. In some of such examples, wearable computing device 4 may also include a sensor hub (that may be separate from SCM 8) which may operate as an input/output controller for one or more of sensors 10. In some examples, the one or more of sensors 10 on which the sensor hub operates as the input/output controller may include one or more sensors different than those sensors of sensors 10 controlled by SCM 8. For instance, the sensor hub may operate as an input/output controller for a gyroscope of sensors 10 where the gyroscope is not controlled by SCM 8. In some examples, the sensor hub may use more power than SCM 8.

SCM 8 may analyze motion data received from one or more of sensors 10. SCM 8 may determine whether or not the motion data satisfies a plurality of thresholds. That is, SCM 8 may determine a plurality of values based on the motion data. If each of the plurality of values satisfies a corresponding threshold, SCM 8 may determine that a user of wearable computing device 4 is attempting to view a display of wearable computing device 4. Responsive to determining that the plurality of conditions are satisfied, SCM 8 may cause application processors 14 and/or a display of UID 12 to transition from a low-power mode to a relatively higher-power mode.

In some examples, wearable computing device 4 may include one or more sensors 10. One or more of sensors 10 may measure one more measurands. Examples of one or more of sensors 10 may include an accelerometer, a gyroscope, a light sensor, a temperature sensor, a pressure (or grip) sensor, a physical switch, a proximity sensor, or a button.

In some examples, wearable computing device 4 may include UID 12. A user associated with wearable computing device 4 may interact with wearable computing device 4 by providing various inputs at wearable computing device 4, e.g., using the at least one UID 12. In some examples, UID 12 may receive tactile, audio, or visual input. In addition to receiving input from a user, UID 12 may output content, such as a graphical user interface (GUI) for display. In some examples, UID12 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. That is, UID 12, in some examples may be a presence-sensitive display. In other examples, the display device can be physically separate from a presence-sensitive device included in wearable computing device 4.

In some examples, wearable computing device 4 may include one or more application processors 14. One or more application processors 14 may implement functionality and/or execute instructions within wearable computing device 4. These instructions executed by application processors 14 may cause wearable computing device 4 to read/write/etc. information during program execution. Examples of one or more of application processors 14 may include one or more microprocessors, digital signal processors (DSPs), application specific integrated circuits (ASICs), field programmable gate arrays (FPGAs), or any other equivalent integrated or discrete logic circuitry, as well as any combinations of such components.

In some examples according to this disclosure, the frame of reference in which a motion sensor determines the orientation of a computing device may differ from that shown in FIG. 1. However, the examples described below include motion sensors that determine orientations in a frame of reference in accordance with the example of FIG. 1. Thus, "vertical" and "horizontal" in such examples correspond to orientations that are treated as generally parallel to gravity and perpendicular to the ground and generally perpendicular to gravity and parallel to the ground, respectively. However, in practice, the orientation of wearable computing device 4 may not be exactly or nearly exactly vertical or horizontal as represented by orientations 18 and 20 in FIG. 1. Thus, FIG. 1 and the associated description provided below illustrate how the orientation of a computing device may be determined with one or more motion sensors when the computing device is only approximately vertical or horizontal, e.g. as defined in the example of FIG. 1, by employing a range of orientations within which the computing device's orientation vector as determined by the motion sensor may lie to designate the computing device in a particular orientation.

Rather than requiring a user of wearable computing device 4 to provide additional input to cause application processor 14 and/or a display of UID 12 to transition from operating in a low-power mode to operating in a higher-power mode, techniques of this disclosure may enable wearable computing device 4 to transition the power mode of application processor 14 and/or a display of UID 12 in response to determining that the user is attempting to use wearable computing device 4. For instance, wearable computing device 4 may determine that the user is attempting to use computing device 4 in response to motion data indicating that the user is attempting to view a display of wearable computing device 4 (e.g., UID 12).

At first time 16A, wearable computing device 4 may be in a first orientation. As illustrated by FIG. 1, wearable computing device 4 may be in first orientation 18 in which wearable computing device 4 may be at the user's side. For instance, in first orientation 18, $V_z$ and $V_y$ may be perpendicular to gravity vector G, and $V_x$ may be parallel to gravity vector G such that a plane on a display of UID 12 is parallel to the X-Z plane. In some examples, first orientation 18 may be different than as illustrated in FIG. 1. For instance, the plane on a display of UID 12 may be parallel to the Y-X plane, such as where the user is driving. Additionally, at first time 16A, wearable computing device 4 may be in a low-power mode in which one or more components of wearable computing device 4 may be off, deactivated, sleeping, have limited functionality, etc. For instance, at first time 16A, a display of UID 12 and application processors 14 may operating in a low-power mode. As illustrated in the example of FIG. 1, UID 12 may output GUI 18A which may be dimmed to conserve power. In this way, wearable computing device 4 may consume a reduced amount of power in the low-power mode when compared to a high-powered operating state (e.g., with UID 12 and application processors 14 being fully powered).

SCM 8 may determine a plurality of motion vectors based on motion data generated by a motion sensor of sensors 10. For instance, where the motion sensor of sensors 10 is a three-axis accelerometer, SCM 8 may determine a plurality of acceleration vectors each having a respective $V_x$ value corresponding to the acceleration in the X axis, a respective $V_y$ value corresponding to the acceleration in the Y axis, and a respective $V_z$ value corresponding to the acceleration in the Z axis. For instance, where wearable computing device 4 is at rest in orientation 18, SCM 8 may determine an acceleration vector of approximately (+9.81, 0, 0).

In any case, a user may attempt to use wearable computing device 4 by, for example, moving his/her arm/wrist in an attempt to view UID 12 of wearable computing device 4. For instance, the user may move wearable computing device 4 from a first (e.g., orientation 18) to a second orientation (e.g., orientation 20) by moving his/her arm/wrist. The motion sensors of sensors 10 may detect the user's movement and SCM 8 may determine a plurality of motion vectors based on the motion data generated by the motion sensors in response to detecting the user's movement.

In some examples, to determine whether or not the user is attempting to view a display of wearable computing device 4, SCM 8 may determine one or more values based the determined plurality of motion vectors. If the one or more values satisfy one or more corresponding thresholds, SCM 8 may determine that the user is attempting to use wearable computing device 4. Some example values include a swept angle value, a gesture duration value, and an ending orientation value.

In some examples, SCM 8 may determine the swept angle value by determining an angle between a first motion vector determined at a first time and a second motion vector determined at a second time that is later than the first time. SCM 8 may determine that the swept angle value is satisfied if the angle is greater than a minimum swept angular threshold (e.g., 45 degrees, 60 degrees, 75 degrees, 90 degrees, etc.).

In some examples, SCM 8 may determine the gesture duration value by determining a time difference between the first time associated with the first motion vector and the second time associated with the second motion vector. SCM 8 may determine that the gesture duration value is satisfied if the time difference is greater than a minimum gesture duration (e.g., 500 milliseconds, 650 milliseconds, 800 milliseconds, etc.).

In some examples, SCM 8 may determine the ending orientation value by determining that a current orientation of wearable computing device 4 is such that it is possible for the user to view a display of UID 12. For instance, SCM 8 may determine that it is possible for the user to view the display of UID 12 where the angle between a plane parallel to the display of UID 12 and a plane perpendicular to gravity vector G satisfies a visibility threshold range (e.g., between 10-60 degrees, between 15-45 degrees, between a range of 20-30 degrees, etc.).

In some examples, SCM 8 may determine when to evaluate the one or more values based on a sequence of threshold events. For instance, SCM 8 may determine the first time used when determining the values as the time where an energy value satisfies an energy threshold, and the second time as the time where, after satisfying the threshold at the first time, the energy value does not satisfy the threshold. In other words, SCM 8 may evaluate the one or more values in response to a threshold event sequence that includes the energy value rising above the threshold and then falling back below the threshold.

SCM 8 may determine the energy value by determining a plurality of difference vectors. For instance, SCM 8 may determine a difference vector based on a difference between a first motion vector of the plurality of vectors that is determined at time i and a second motion vector of the plurality of motion vectors that is determined at time i+1. In other words, SCM 8 may determine that difference vector D(i)=M(i+1)−M(i). In this way, SCM 8 may reduce or eliminate the contribution of gravity vector G.

As time elapses, SCM 8 may receive new motion data from the sensor of sensors 10. As such, in some examples, SCM 8 may only retain a certain quantity of determined difference vectors. For instance, SCM 8 may retain only the ten most recent difference vectors. In various instances, SCM 8 may store the determined difference vectors in a fixed-length first-in first-out (FIFO) queue.

In some examples, SCM 8 may determine the energy value by determining a sum of the squared norms of a set of difference vectors (e.g., the set of difference vectors stored in the FIFO queue). For instance, SCM 8 may determine the energy value in accordance with equation (1), below, where Et is the energy value for time t, n is a quantity of stored difference vectors, $D_x(i)$ is an X component of a stored difference vector for time i, $D_y(i)$ is a Y component of the stored difference vector, and $D_z(i)$ is a Z component of the stored difference vector.

$$E_t = \Sigma_{i=t-n}{}^n D_x(i)^2 + D_y(i)^2 + D_z(i)^2 \qquad (1)$$

As stated above, SCM 8 may determine when to evaluate the one or more values based on the determined energy value. For instance, when determining the swept angle value, SCM 8 may utilize the motion vector for the time at which the energy value crossed over the energy threshold as the first motion vector, and the motion vector for the time at which the energy value crossed back over the energy threshold as the second motion vector. Additionally, when determining the gesture duration value, SCM 8 may utilize the time at which the energy value crossed over the energy threshold as the first time, and the time at which at which the energy value crossed back over the energy threshold as the second time.

As discussed above, SCM 8 may determine that the user is attempting to view a display of wearable computing device 4 in response to determining that the one or more values satisfy the one or more corresponding thresholds. Responsive to determining that the user of wearable computing device 4 is attempting to view a display of wearable computing device 4, SCM 8 may output a signal to one or more other components of wearable computing device 4. For example, SCM 8 may output a signal to one or more other components of wearable computing device 4 that causes application processor 14 and/or a display of UID 12 to transition from operation in a low-power mode to operation in a higher-power mode. In this example of FIG. 1, upon transitioning into the higher-power operating mode, UID 12 may output GUI 18B at a higher brightness than GUI 18A. In this way, as opposed to requiring that the user of wearable computing device 4 provide additional input, techniques of this display may enable wearable computing device 4 to activate a display in response to determining that the user is attempting to view the display of wearable computing device 4.

Figure 2:
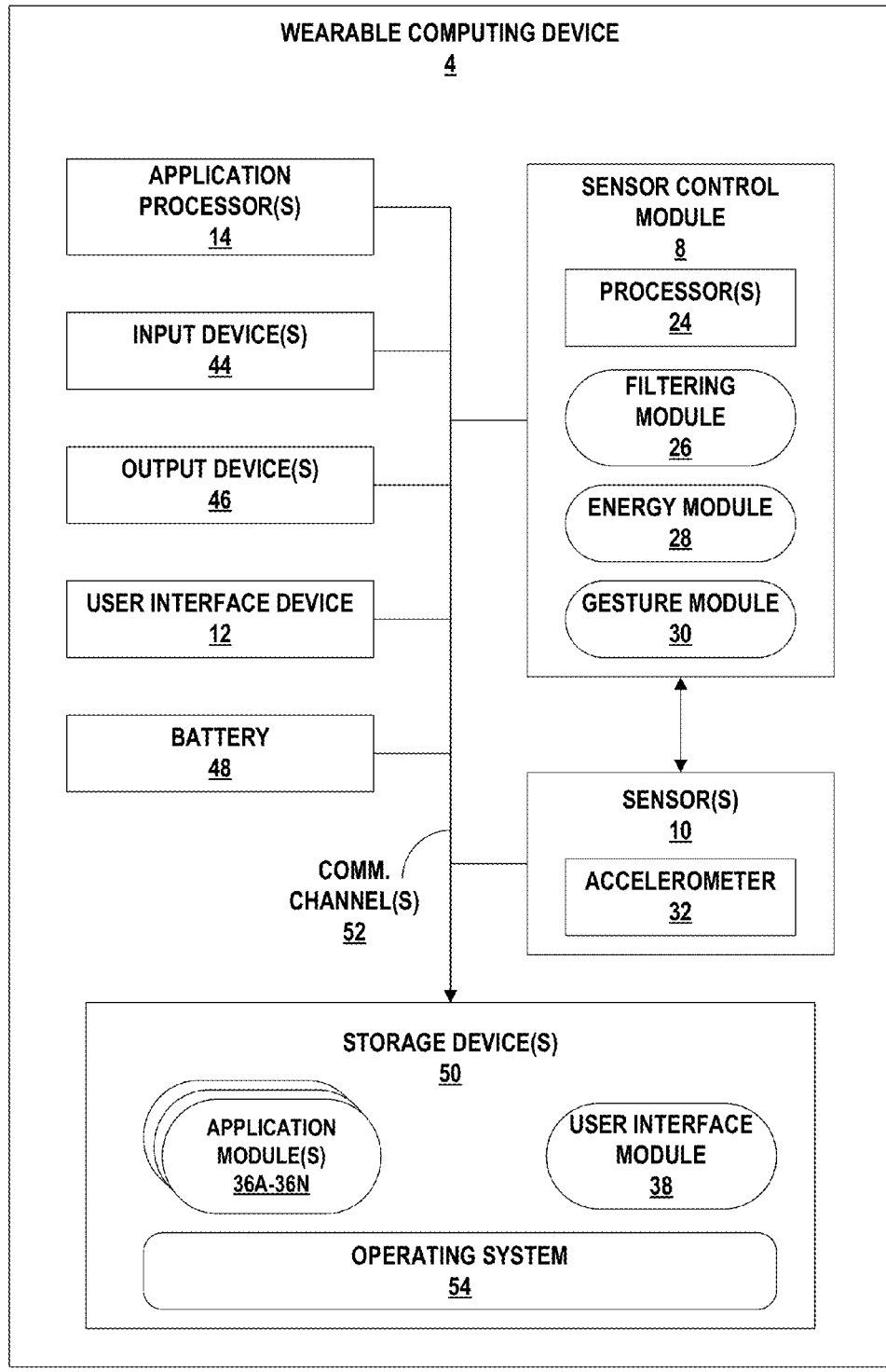
FIG. 2 is a block diagram illustrating an example wearable computing device, in accordance with one or more techniques of the present disclosure.

FIG. 2 is a block diagram illustrating an example computing device, in accordance with one or more techniques of the present disclosure. FIG. 2 illustrates one particular example of wearable computing device 4, and many other examples of wearable computing device 4 may be used in other instances and may include a subset of the components included in example wearable computing device 4 or may include additional components not shown in FIG. 2.

As shown in the example of FIG. 2, wearable computing device 4 includes sensor control module 8 ("SCM 8"), one or more sensors 10, user interface device 12 ("UID 12"), one or more application processors 14, one or more input devices 44, one or more output devices 46, battery 48, and one or more storage devices 50. Storage devices 50 of wearable computing device 4 may also include application modules 36A-36N (collectively, "application modules 36"), user interface module 38 ("UIM 38") and operating system 54. Wearable computing device 4 can include additional components that, for clarity, are not shown in FIG. 2. For example, wearable computing device 4 can include a communication unit to enable wearable computing device 4 to communicate with other devices. Similarly, the components of wearable computing device 4 shown in FIG. 2 may not be necessary in every example of wearable computing device 4. For example, in some configurations, wearable computing device 4 may not include output devices 46.

Communication channels 52 may interconnect each of the components 8, 10, 12, 14, 44, 46, 48, and 50 for inter-component communications (physically, communicatively, and/or operatively). In some examples, communication channels 52 may include a system bus, a network connection, an inter-process communication data structure, or any other method and/or structure for communicating data.

One or more application processors 14 may implement functionality and/or execute instructions within wearable computing device 4. For example, application processors 14 on wearable computing device 4 may receive and execute instructions stored by storage devices 50 that execute the functionality of modules 36, 38, and 54. These instructions executed by application processors 14 may cause wearable computing device 4 to read/write/etc. information, such as one or more data files stored within storage devices 50 during program execution. Application processors 14 may execute instructions of modules 36, 38, and 50 to cause UID 12 to output one or more graphical indications of incoming communications for display at UID 12 as content of a user interface. That is, application modules 36, UIM 38, and 54 may be operable by application processors 14 to perform various actions or functions of wearable computing device 4, for instance, causing UID 12 to a present a graphical user interface at UID 12.

One or more input devices 44 of wearable computing device 4 may receive input. Examples of input are tactile, audio, and video input. One or more of input devices 44 of wearable computing device 4, in one example, may include a presence-sensitive display, touch-sensitive screen, mouse, keyboard, voice responsive system, video camera, microphone, or any other type of device for detecting input from a human or machine.

One or more output devices 46 of wearable computing device 4 may generate output. Examples of output are tactile, audio, and video output. One or more of output devices 46 of wearable computing device 4, in one example, may include a presence-sensitive display, sound card, video graphics adapter card, speaker, cathode ray tube (CRT) monitor, liquid crystal display (LCD), or any other type of device for generating output to a human or machine.

In some examples, UID 12 of wearable computing device 4 may include functionality of input devices 44 and/or output devices 46. In the example of FIG. 2, UID 12 may be a presence-sensitive display. In some examples, a presence-sensitive display may include a presence sensitive input device that detects an object at and/or near a screen. As one example range, a presence-sensitive input device may detect an object, such as a finger or stylus that is within two inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive display also includes an output device that provides output to a user using tactile, audio, or video stimuli (e.g., the output device may be a display device) as described with respect to output device 46, e.g., at a display. In the example of FIG. 2, UID 12 may present one or more graphical user interfaces.

While illustrated as an internal component of wearable computing device 4, UID 12 also represents an external component that shares a data path with wearable computing device 4 for transmitting and/or receiving input and output. For instance, in one example, UID 12 represents a built-in component of wearable computing device 4 located within and physically connected to the external packaging of wearable computing device 4 (e.g., a screen on a mobile phone). In another example, UID 12 represents an external component of wearable computing device 4 located outside and physically separated from the packaging of wearable computing device 4 (e.g., a monitor, a projector, etc. that shares a wired and/or wireless data path with a tablet computer).

SCM 8 may collect and analyze sensor data. For instance, SCM 8 may collect any analyze sensor data from one or more of sensors 10 (e.g., accelerometer 32). As illustrated in FIG. 2, SCM 8 may include one or more processors 24, filtering module 26, energy module 28, and gesture module 30. In some examples, SCM 8 may be a discrete component within wearable computing device 4. In some examples, SCM 8 may be integrated into one or more other components of wearable computing device 4, such as one or more of application processors 14. In some examples, SCM 8 may include additional components that, for simplicity, are not shown in FIG. 2. For instance, SCM 8 may include one or more analog-to-digital converters which may facilitate communication between one or more of sensors 10 and one or more of processors 24. Additionally, SCM 8 may include one or more storage devices which may store filtering module 26, energy module 28, and gesture module 30. In some examples, the one or more storage devices included in SCM 8 may be similar to storage devices 50 as described below.

Processors 24 may implement functionality and/or execute instructions within SCM 8. For example, one or more of processors 24 may receive and execute instructions stored by a storage device that execute the functionality of filtering module 26, energy module 28, and/or gesture module 30. These instructions executed by one or more of processors 24 may cause SCM 8 to read/write/etc. information, such as one or more data files stored within a storage device during program execution.

Filtering module 26 may be executable by one or more of processors 24 to filter sensor data measured by one or more of sensors 10. For instance, filtering module 26 may filter a sequence of motion vectors received from accelerometer 32 of sensors 10. Filtering module 26 may output the filtered motion vectors to one or more components of wearable computing device 4, such as energy module 28 and/or gesture module 30.

Energy module 28 may be executable by one or more of processors 24 to determine an energy value based on a sequence of motion vectors. For instance, energy module 28 may determine an energy value based on a sequence of filtered motion vectors received from filtering module 26. Energy module 28 may also be executable by one or more of processors 24 to determine whether or not the determined energy value satisfies a threshold. Energy module 28 may be configured to output a signal to one or more other components that indicates whether or not a determined energy value satisfies an energy threshold and a time that corresponds to the determined energy value.

Gesture module 30 may be executable by one or more of processors 24 to determine whether or not a user associated with wearable computing device 4 has performed a gesture to use wearable computing device 4. For instance, gesture module 30 may determine, based on filtered motion vectors received from filtering module 26, a plurality of values. If the each of the plurality of values satisfies a respective threshold, gesture module 30 may determine that the user has performed a gesture to use wearable computing device 4. Responsive to determining that each of the plurality of values satisfies the respective threshold, gesture module 30 may output a signal to one or more other components of wearable computing device 4 that causes the one or more other components to transition from operating in a low-power mode to operating in a higher-power mode. In some examples, gesture module 30 may be configured to determine whether wearable computing device 4 is attached to a left-arm or a right-arm of the user of wearable computing device 4. In some examples, gesture module 30 may be configured to determine whether wearable computing device 4 is attached to an anterior surface or a posterior surface of an arm of the user of wearable computing device 4.

Sensors 10 may collect information associated with wearable computing device 4. For instance, one or more of sensors 10 may measure the geographical location, object clearance, rotation, velocity, and/or acceleration of wearable computing device 4. Examples of one or more of sensors 10 may include an accelerometer, a gyroscope, a global positioning system sensor, a light sensor, a temperature sensor, a pressure (or grip) sensor, a physical switch, a proximity sensor, or a button. As illustrated in the example of FIG. 2, sensors 10 may include accelerometer 32. In some examples, in an effort to reduce the quantity and/or power consumption of components included in wearable computing device 4, sensors 10 may include accelerometer 32 and may not include a gyroscope. In some examples, one or more of sensors 10 may include one or more processors. For instance, one or more of sensors 10 may include one or more microprocessors, digital signal processors (DSPs), application specific integrated circuits (ASICs), field programmable gate arrays (FPGAs), or any other equivalent integrated or discrete logic circuitry, as well as any combinations of such components.

One or more storage devices 50 within wearable computing device 4 may store information for processing during operation of wearable computing device 4 (e.g., wearable computing device 4 may store data that modules 36 and 38 and operating system 54 may access during execution at wearable computing device 4). In some examples, storage device 50 is a temporary memory, meaning that a primary purpose of storage device 50 is not long-term storage. Storage devices 50 on wearable computing device 4 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 50, in some examples, also include one or more computer-readable storage media. Storage devices 50 may store larger amounts of information than volatile memory. Storage devices 50 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 50 may store program instructions and/or information (e.g., data) associated with application modules 36, UIM 38, and operating system 54.

Operating system 54, in some examples, controls the operation of components of wearable computing device 4. For example, operating system 54, in one example, facilitates the communication of application modules 36 with application processors 14, one or more input devices 44, one or more output devices 46, UID 12, one or more sensors 10, and SCM 8. Each of application modules 36 may include program instructions and/or data that are executable by wearable computing device 4 (e.g., by one or more application processors 14).

UIM 38 may cause UID 12 to output a graphical user interface (e.g., graphical user interfaces 18A, 18B) for display, which may enable a user of wearable computing device 4 to view output and/or provide input at UID 12. UIM 38 and UID 12 may receive one or more indications of input from a user as the user interacts with the graphical user interface, at different times and when the user and wearable computing device 4 are at different locations. UIM 38 and UID 12 may interpret inputs detected at UID 12 (e.g., as a user provides one or more gestures at one or more locations of UID 12 at which the graphical user interface is displayed) and may relay information about the inputs detected at UID 12 to one or more associated platforms, operating systems, applications, and/or services executing at wearable computing device 4, to cause wearable computing device 4 to perform functions.

UIM 38 may receive information and instructions from one or more associated platforms, operating systems, applications, and/or services executing at wearable computing device 4 (e.g., application modules 36) for generating a graphical user interface. In addition, UIM 38 may act as an intermediary between the one or more associated platforms, operating systems, applications, and/or services executing at wearable computing device 4 and various output devices of wearable computing device 4 (e.g., speakers, LED indicators, audio or electrostatic haptic output device, etc.) to produce output (e.g., a graphic, a flash of light, a sound, a haptic response, etc.) with wearable computing device 4.

Battery 48 may provide power to one or more components of wearable computing device 4. Examples of battery 48 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. Battery 48 may have a limited capacity (e.g., 1000-3000 mAh).

Modules 26, 28, 30, 36, and 38 may perform operations described herein using software, hardware, firmware, or any combination of hardware, software, and firmware residing in and executing on wearable computing device 4. Wearable computing device 4 may execute modules 26, 28, 30, 36, and 38 with multiple processors. Wearable computing device 4 may execute any of modules 26, 28, 30, 36, and 38 as or within a virtual machine executing on underlying hardware. Modules 26, 28, 30, 36, and 38 may be implemented in various ways. For example, any of modules 26, 28, 30, 36, and 38 may be implemented as a downloadable or pre-installed application or "app." In another example, any of modules 26, 28, 30, 36, and 38 may be implemented as part of an operating system of wearable computing device 4.

Due to the limited capacity, the period of time for which wearable computing device 4 may operate with power provided by battery 48 may be based on the amount of power consumed by wearable computing device 4. As such, in order to increase the period of time for which wearable computing device 4 may operate with power provided by battery 48, it may be desirable to reduce the amount of power consumed by wearable computing device 4. As it may be undesirable to reduce performance while a user is interacting with (i.e., using) wearable computing device 4, it may be desirable to reduce the amount of power consumed by wearable computing device 4 while not in use by the user.

Rather than requiring a user of wearable computing device 4 to provide additional input to cause application processor 14 and/or a display of UID 12 to transition from operating in a low-power mode to operating in a higher-power mode, techniques of this disclosure may enable wearable computing device 4 to transition the power mode of application processor 14 and/or a display of UID 12 in response to determining that the user is attempting to use wearable computing device 4. For instance, wearable computing device 4 may determine that the user is attempting to use computing device 4 in response to motion data indicating that the user is attempting to view wearable computing device 4.

As one example, filtering module 26 of SCM 8 may receive a sequence of motion vectors from a motion sensor of sensors 10 (e.g., accelerometer 32). In some examples, such as where the motion sensor of sensors 10 is accelerometer 32, the motion vectors may be acceleration vectors. Filtering module 26 may filter the sequence of motion vectors received from the motion sensor to determine a sequence of filtered motion vectors. In some examples, filtering module 26 may implement a moving average to filter the sequence of motion vectors. In some examples, the moving average may be a weighted moving average. For instance, to determine a filtered motion vector, filtering module 26 may multiply an average of a previously received set of unfiltered motion vectors by a first weighting value (e.g., 0.5, 0.7, 0.9, etc.) and multiply a recently received unfiltered motion vector by a second weighting value (e.g., 0.5, 0.3, 0.1, etc.). In some examples, the moving average may be an exponentially weighted moving average. In some examples, filtering module 26 may determine the filtered motion vector by multiplying a filtered motion vector that corresponds to time i–1 by the first weighting value and multiply a recently received unfiltered motion vector by a second weighting value. In other words, filtering module 26 may determine the filtered motion vector in accordance with equation (2), below, where FMV(i) is the filtered motion vector that corresponds to time i, MV(n) is the unfiltered motion vector that corresponds to time n, and $W_1$ and $W_2$ are weighting factors. In some examples, the second weighting factor may be determined by subtracting the first weighting factor from one (i.e., $W_2=1-W_1$). In any case, filtering module 26 may output the sequence of filtered motion vectors to energy module 28 and/or gesture module 30.

$$FMV(i)=FMV(i-1)*W_1+MV(i)*W_2 \quad (2)$$

Energy module 28 may determine a sequence of energy values based on the sequence of motion vectors. In some examples, energy module 28 may determine the energy values by determining a plurality of difference vectors. For instance, energy module 28 may determine a difference vector based on a difference between a first motion vector of the plurality of vectors that corresponds to time i and a second motion vector of the plurality of motion vectors that corresponds to time i+1. In other words, energy module 28 may determine that difference vector in accordance with equation (3), below where D(i) is the difference vector that corresponds to time i, and MV(i) is the motion vector that corresponds to time i. In this way, energy module 28 may reduce or eliminate the contribution of a gravity vector to the determined energy.

$$D(i)=MV(i)-MV(i-1) \quad (3)$$

As time elapses, energy module 28 may receive new motion data. As such, in some examples, energy module 28 may only retain a certain quantity of determined difference vectors. For instance, energy module 28 may retain only the ten most recent difference vectors. In other words, energy module 28 may store the determined difference vectors in a fixed-length first-in first-out (FIFO) queue.

In some examples, energy module 28 may determine the energy value by determining a sum of the squared norms of a set of difference vectors (e.g., the set of difference vectors stored in the FIFO queue). For instance, energy module 28 may determine the energy value in accordance with equation (4), below, where $E_t$ is the energy value corresponding to time t, n is a quantity of stored difference vectors, $D_x(i)$ is an X component of a stored difference vector corresponding to time i, $D_y(i)$ is a Y component of the stored difference vector, and $D_z(i)$ is a Z component of the stored difference vector.

$$E_t=\Sigma_{i=t-n}{}^n D_x(i)^2+D_y(i)^2+D_z(i)^2 \quad (4)$$

Energy module 28 may determine whether or not the determined energy value satisfies an energy threshold (e.g., 0.01, 0.05, 0.10, etc.). For instance, if energy module 28 determines that an energy value corresponding to time i is greater than the energy threshold, energy module 28 may determine whether or not the energy value corresponding to time i−1 was less than the threshold. If the energy value corresponding to time i is greater than the energy threshold and the energy value corresponding to time i−1 was less than the energy threshold, energy module 28 may set a flag that indicates that a potential gesture may be in progress. Additionally, in such cases, energy module 28 may identify a motion vector that corresponds to the same time as the energy value that is greater than the energy threshold as a starting motion vector. In other words, if the energy value corresponding to time i is greater than the energy threshold and the energy value corresponding to time i−1 was less than the energy threshold, energy module 28 may identify the motion vector corresponding to time i as a starting motion vector for a gesture and set a flag indicating that a potential gesture is in progress.

In any case, energy module 28 may then determine whether an energy value corresponding to time i+1 is less than the energy threshold. If energy module 28 determines that the energy value corresponding to time i+1 is less than the energy threshold and that the flag indicating that a potential gesture may be in progress is set, energy module 28 may determine that the potential gesture is completed. Additionally, in such cases, energy module 28 may identify a motion vector that corresponds to the same time as the energy value that is less than the energy threshold when the flag is set as an ending motion vector. In other words, if the energy value corresponding to time i+1 is less than the energy threshold and the flag is set, energy module 28 may identify the motion vector corresponding to time i+1 as an ending motion vector, determine that the gesture is complete, and may clear the potential gesture flag. In any event, energy module 28 may output a signal to gesture module 30 that indicates the starting motion vector, the ending motion vector, the time corresponding to the starting motion vector, and/or the time corresponding to the ending motion vector.

Responsive to energy module 28 determining that the gesture is complete, gesture module 30 may determine whether or not the gesture indicates that the user is attempting to use wearable computing device 4. For instance, gesture module 30 may determine a plurality of values. Some example values include a swept angle value, a gesture duration value, and an ending orientation value.

In some examples, gesture module 30 may determine the swept angle value by determining an angle between a first motion vector that corresponds to a first time and a second motion vector that corresponds to a second time that is later than the first time. For instance, gesture module 30 may determine the angle between the starting motion vector identified by energy module 28 and the ending motion vector identified by energy module 28. Gesture module 30 may determine that the swept angle value is satisfied if the angle is greater than a minimum swept angular threshold (e.g., 45 degrees, 60 degrees, 75 degrees, 90 degrees, etc.).

In some examples, gesture module 30 may determine the gesture duration value by determining a time difference between the first time associated with the first motion vector and the second time associated with to the second motion vector. For instance, gesture module 30 may determine the time difference between the time that corresponds to the starting motion vector identified by energy module 28 and the time that corresponds to the ending motion vector identified by energy module 28. Gesture module 30 may determine that the gesture duration value is satisfied if the time difference is greater than a minimum gesture duration (e.g., 500 milliseconds, 650 milliseconds, 800 milliseconds, etc.).

In some examples, gesture module 30 may determine the ending orientation value by determining that an orientation of wearable computing device 4 is such that it is possible for the user to view a display of UID 12 (i.e., if the display is within a visibility threshold). As one example, gesture module 30 may determine that it is possible for the user to view the display of UID 12 where an angle between a Y component of a motion vector and a plane perpendicular to gravity vector G is greater than a Y threshold in degrees (e.g., ~15 degrees), such as where the absolute value of the Y component of the motion vector is greater than the Y threshold in newtons (e.g., ~1.4 newtons), and/or where an angle between an X component of the motion vector and the plane perpendicular to gravity vector G is less than an X threshold in degrees (e.g., ~30 degrees), such as where the absolute value of the X component of the motion vector is less than the X threshold in newtons (e.g., ~3 newtons). As another example, gesture module 30 may determine that it is possible for the user to view the display of UID 12 where the angle between a plane parallel to the display of UID 12 and a plane perpendicular to gravity vector G satisfies a visibility threshold range (e.g., between 10-60 degrees, between 15-45 degrees, between a range of 20-30 degrees, etc.).

Responsive to determining that each of the plurality of test values satisfies the respective threshold, gesture module 30 may determine that the user is attempting to use wearable computing device 4 and send a signal to one or more other components of wearable computing device 4 that causes at least one of the one or more other components to transition from operating in a low-power mode to operating in a higher-power mode. As one example, gesture module 30 may send an interrupt signal to application processor 14 that causes application processor 14 to transition from operating in a low-power mode to operating in a higher-power mode. Responsive to transition from operating in the low-power mode to operating in the higher-power mode, application processor 14 may send a signal to the display of UID 12 that causes the display to output a GUI, such as GUI 18B of FIG. 1. As another example, gesture module 30 may send a signal to the display of UID 12 that causes the display to activate (e.g., turn on).

In some examples, the user of wearable computing device 4 may be walking when attempting to use wearable computing device 4. In some examples, as the user of wearable computing device 4 walks, he/she may move the wrist to which wearable computing device 4 may be attached. In some examples, this movement may be periodic. In other words, the user of wearable computing device 4 may swing his/her arms as he/she walks. In accordance with one or more techniques of this disclosure wearable computing device 4 may determine whether or not the user of wearable computing device 4 is walking.

As one example, SCM 8 may determine whether or not the user of wearable computing device 4 is walking based on the sequence of motion vectors received from a motion sensor of sensors 10 (e.g., accelerometer 32). In some examples, SCM 8 may analyze the sequence of motion vectors with a peak detector to determine whether or not the user of wearable computing device 4 is walking. For instance, energy module 28 may implement a peak detector to determine the occurrence of an upper crossing event. In some examples, energy module 28 may determine than an upper crossing event occurred when a determined energy value associated with time i is greater than a walking energy threshold, a motion vector associated with time i is greater than a motion threshold, and a motion vector associated with time i−1 is not greater than the motion threshold.

As discussed above, energy module 28 may determine an energy value by determining a sum of the squared norms of a set of difference vectors. In some examples, as opposed to determining the energy value based on multiple axial components of the difference vectors, energy module 28 may determine the energy value based on a particular axial component of the difference vectors. For instance, energy module 28 may determine the energy value in accordance with equation (4a), below, where $E_t$ is the energy value corresponding to time t, n is a quantity of stored difference vectors, and $D_x(i)$ is an X component of a stored difference vector corresponding to time i. In some examples, energy module 28 may determine the energy value based on a quantity of difference vectors that corresponds to a plurality of periodic user movements (e.g., n may be selected such that a difference between a time associated with $D_x(0)$ and $D_x(n)$ is approximately three seconds).

$$E_t = \Sigma_{i=t-n}^{n} D_x(i)^2 \quad (4a)$$

Energy module 28 may determine whether or not the determined energy value satisfies the walking energy threshold (e.g., 0.01, 0.03, 0.05, 0.10, etc.). In some examples, energy module 28 may compare the determined energy value to the same threshold when determine whether or not the user of wearable computing device 4 is walking than when determining whether or not the user of wearable computing device 4 is attempting to use wearable computing device 4. In some examples, energy module 28 may compare the determine energy value to a different threshold when determine whether or not the user of wearable computing device 4 is walking than when determining whether or not the user of wearable computing device 4 is attempting to use wearable computing device 4.

In some examples, energy module 28 may determine the motion threshold. As one example, energy module 28 may determine the motion threshold by determining the $P^{th}$ percentile of a set of motion vectors. For instance, energy module 28 may determine the motion threshold as the $70^{th}$ percentile of the most recent 300 motion vectors. In some examples, as opposed to determining the motion threshold based on multiple axial components of the motion vectors, energy module 28 may determine the motion threshold based on a particular axial component of the motion vectors. In some examples, the axial component of the motion vectors used by energy module 28 when determining the motion threshold may be the same axial component used by energy module 28 when determining the energy value.

In any case, in response to determining that an upper crossing event has occurred, energy module 28 may determine that the user of wearable computing device 4 is walking. In some examples, responsive to determining that the user of wearable computing device 4 is walking, energy module 28 may set a flag (e.g., isWalking) that indicates whether or not the user of wearable computing device 4 is walking to true. Additionally, in such cases, energy module 28 may identify the motion vector that satisfied the motion threshold as a starting motion vector.

As time elapses, energy module 28 may receive new motion data (i.e., motion data corresponding to time i+1). In some examples, responsive to receiving new motion data, energy module 28 may determine whether or not the user of wearable computing device 4 is still walking. In some examples, energy module 28 may determine whether or not the user of wearable computing device 4 is still walking by determining whether or not a time difference between a time associated with the new motion data and a time associated with the most recent upper crossing event satisfies a threshold amount of time (e.g., 0.5 seconds, 1.0 seconds, 1.5 seconds, etc.). In some examples, responsive to determining that the user of wearable computing device 4 has stopped walking, energy module 28 may set the flag (e.g., isWalking) that indicates whether or not the user of wearable computing device 4 is walking to false.

In any case, energy module 28 may determine whether an energy value corresponding to time i+1 is less than an energy threshold. In some examples, energy module 28 may use a different energy threshold where the flag that indicates whether or not the user of wearable computing device 4 is walking is set to false as opposed to set to true. For instance, energy module 28 may use a lower energy threshold where the flag that indicates whether or not the user of wearable computing device 4 is walking is set to true.

If energy module 28 determines that the energy value corresponding to time i+1 is less than the energy threshold, energy module 28 may determine that the potential gesture is completed. Additionally, in such cases, energy module 28 may identify a motion vector that corresponds to the same time as the energy value that is less than the energy threshold as an ending motion vector. In other words, if the energy value corresponding to time i+1 is less than the energy threshold and the flag is set, energy module 28 may identify the motion vector corresponding to time i+1 as an ending motion vector, and may determine that the gesture is complete. In any event, energy module 28 may output a signal to gesture module 30 that indicates the starting motion vector, the ending motion vector, the time corresponding to the starting motion vector, and/or the time corresponding to the ending motion vector. As discussed above, gesture module 30 may then whether or not the gesture indicates that the user is attempting to use wearable computing device 4.

Figure 3:
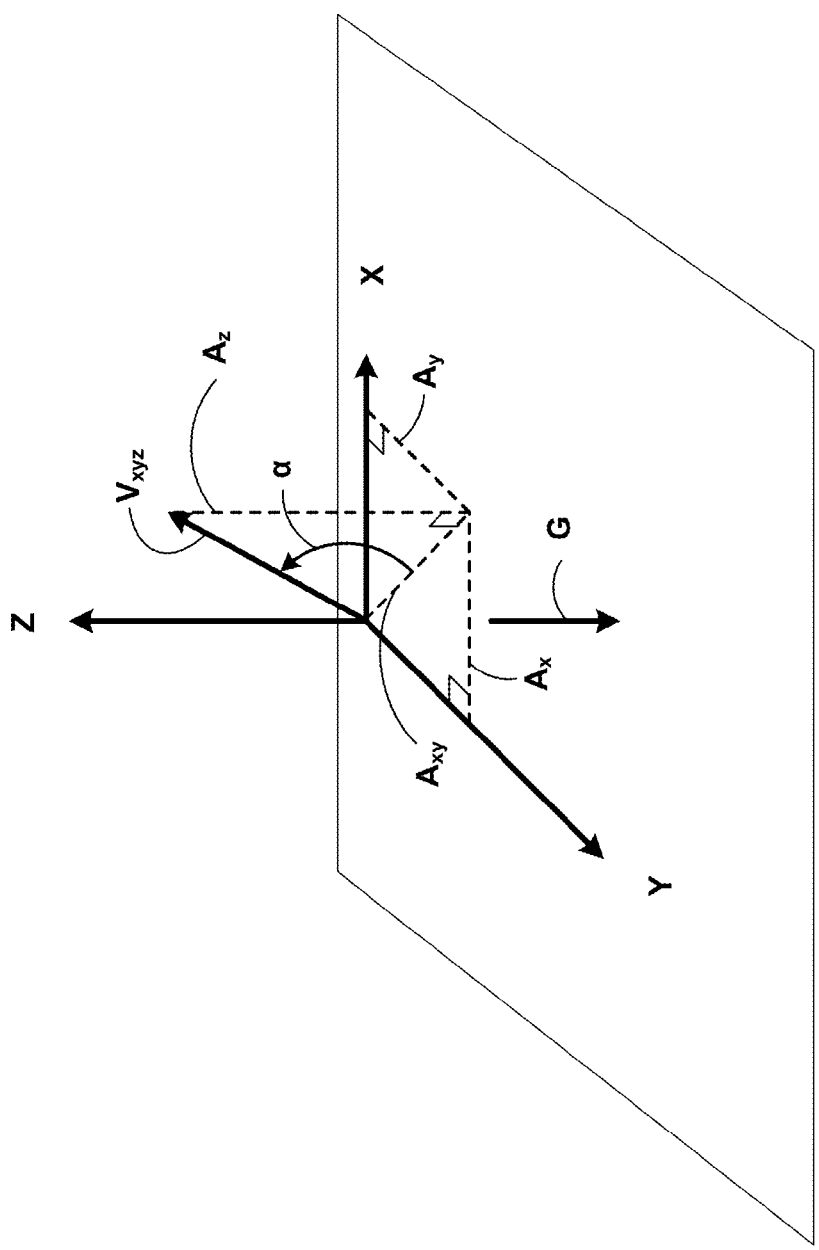
FIG. 3 illustrates an example orientation vector of a wearable device detected by a motion sensor, in accordance with one or more techniques of the present disclosure.

FIG. 3 illustrates an example orientation vector of a wearable device detected by a motion sensor, in accordance with one or more techniques of the present disclosure. As illustrated by FIG. 3, $V_{XYZ}$ may correspond to a vector, which represents the orientation of a device in three dimensions.

The orientation of wearable computing device 4, and, in particular, the vector, $V_{xyz}$ may be defined by the magnitudes of the vector in the X, Y, and Z directions $A_x$, $A_y$, and $A_z$, respectively, as well as the angles between the vector and each of the X, Y, and Z axes (not shown in FIG. 3). In some examples, one or more processors of wearable computing device 4 may operate according to one or more techniques that approximate the orientation of wearable computing device 4 as one of horizontal or vertical based on the angle, α, between the orientation vector, $V_{xyz}$, and the projection of the vector onto the horizontal X-Y plane.

For example, one or more of processors 24 may receive the magnitudes $A_x$, $A_y$, $A_z$ of vector, $V_{xyz}$ in the X, Y, Z directions from a motion sensor, such as a motion sensor of sensor 10, respectively in the example of FIG. 3. One or more of processors 24 may then calculate the magnitude, $A_{xy}$, of the projection of vector, $V_{xyz}$ in the X-Y plane according to equation (5), below. As another example, one or more of processors 24 may calculate the magnitude, $A_{xyz}$, of the 3D acceleration vector according to equation (6), below.

$$A_{xy} = \sqrt{A_x^2 + A_y^2} \qquad (5)$$

$$A_{xyz} = \sqrt{A_x^2 + A_y^2 + A_z^2} \qquad (6)$$

One or more of processors 24 may then calculate the angle, α, between the orientation vector, $V_{xyz}$, and the projection of the vector onto the horizontal X-Y plane as a function of the arc tangent of the magnitude, $A_z$, of the vertical component of the orientation vector, $V_{xyz}$ and the magnitude, $A_{xy}$, of the projection of the vector in the X-Y plane. For example, one or more of processors 24 may calculate the angle, α, according to the following equation.

$$\alpha = \arctan\left(\frac{A_z}{A_{xy}}\right) \qquad (7)$$

In one example, one or more of processors 24 may approximate the orientation of wearable computing device 4 as vertical when the angle, α, between the orientation vector, $V_{xyz}$, and the projection of the vector onto the horizontal X-Y plane is greater than a threshold. In some examples, the threshold may be 35 degrees. In some examples, the threshold may be 50 degrees.

In another example, one or more of processors 24 may determine that a user of wearable computing device 4 may view a display of computing device 4 (e.g., a display of UID 12) where the angle, α, between the orientation vector, $V_{xyz}$, and the projection of the vector onto the horizontal X-Y plane satisfies a visibility angular threshold range (e.g., between 10-60 degrees, between 15-45 degrees, between a range of 20-30 degrees, etc.).

In accordance with or more techniques of this disclosure, one or more of processors 24 may determine, based on motion data measured by a motion sensor of sensors 10 (e.g., accelerometer 32), that a user of wearable computing device 4 is attempting to use wearable computing device 4. For instance, one or more of processors 24 may determine the magnitude, an angle θ between a first vector corresponding to a first time $V_{xyz1}$, and a second vector corresponding to a second time $V_{xyz2}$, in accordance with equation (8), below, where $V_{xyz1} \cdot V_{xyz2}$ is the dot product of the first vector and the second vector, $\|V_{xyz1}\|$ is the magnitude of the first vector, and $\|V_{xyz2}\|$ is the magnitude of the second vector.

$$\theta = \cos^{-1}\left(\frac{V_{xyz1} \cdot V_{xyz2}}{\|V_{xyz1}\| * \|V_{xyz2}\|}\right) \qquad (8)$$

In some examples, if the θ is greater than a threshold, one or more of processors 24 may determine that a swept angle value is satisfied.

Figure 4:
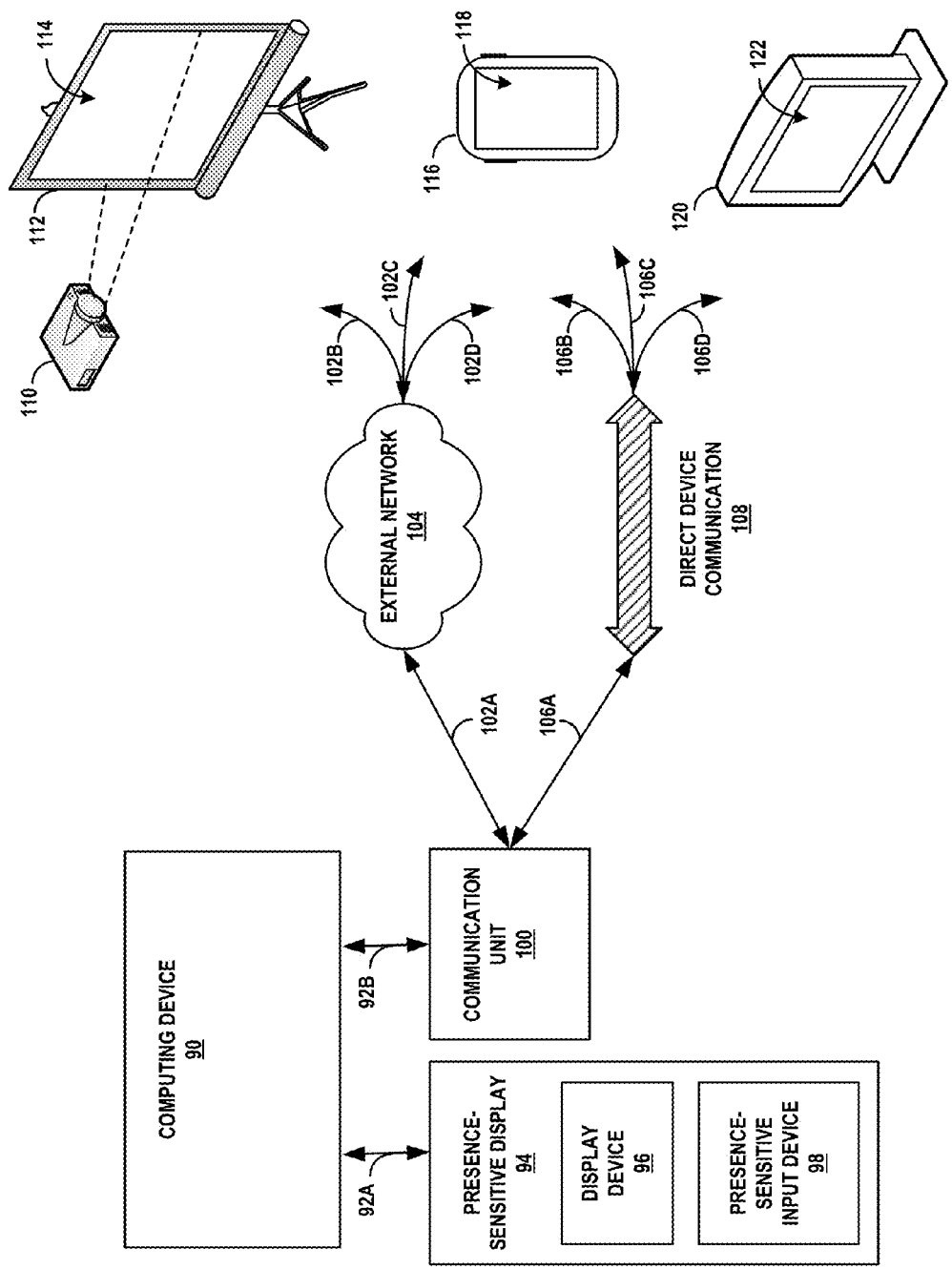
FIG. 4 is a block diagram illustrating an example computing device that outputs graphical content for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 90, presence-sensitive display 94, communication unit 100, projector 110, projector screen 112, mobile device 116, and visual display device 120. Although shown for purposes of example in FIGS. 1 and 2 as stand-alone wearable computing device 4, a computing device, such as computing device 90 may, generally, be any component or system that includes a processor or other suitable computing environment for executing software instructions and, for example, need not include a presence-sensitive display.

As shown in the example of FIG. 4, computing device 90 may be a processor that includes functionality as described with respect to processor 40 in FIG. 2. In such examples, computing device 90 may be operatively coupled to presence-sensitive display 94 by a communication channel 92A, which may be a system bus or other suitable connection. Computing device 90 may also be operatively coupled to communication unit 100, further described below, by a communication channel 92B, which may also be a system bus or other suitable connection. Although shown separately as an example in FIG. 4, computing device 90 may be operatively coupled to presence-sensitive display 94 and communication unit 100 by any number of one or more communication channels.

In other examples, such as illustrated previously by wearable computing device 4 in FIGS. 1-2, a computing device may refer to a portable or mobile device such as mobile phones (including smart phones), wearable computing devices (including smart watches and headsets) laptop computers, etc.

Presence-sensitive display 94, like UID 12 of FIG. 1, may include display device 96 and presence-sensitive input device 98. Display device 96 may, for example, receive data from computing device 90 and display the graphical content. In some examples, presence-sensitive input device 98 may determine one or more user inputs (e.g., continuous gestures, multi-touch gestures, single-touch gestures, etc.) at presence-sensitive display 94 using capacitive, inductive, and/or optical recognition techniques and send indications of such user input to computing device 90 using communication channel 92A. In some examples, presence-sensitive input device 98 may be physically positioned on top of display device 96 such that, when a user positions an input unit over a graphical element displayed by display device 96, the location at which presence-sensitive input device 98 corresponds to the location of display device 96 at which the graphical element is displayed. In other examples, presence-sensitive input device 98 may be positioned physically apart from display device 96, and locations of presence-sensitive input device 98 may correspond to locations of display device 96, such that input can be made at presence-sensitive input device 98 for interacting with graphical elements displayed at corresponding locations of display device 96.

As shown in FIG. 4, computing device 90 may also include and/or be operatively coupled with communication unit 100. Communication unit 100 may include functionality of communication unit 42 as described in FIG. 2. Examples of communication unit 100 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 90 may also include and/or be operatively coupled with one or more other devices, e.g., input devices, output devices, memory, storage devices, etc. that are not shown in FIG. 4 for purposes of brevity and illustration.

FIG. 4 also illustrates a projector 110 and projector screen 112. Other such examples of projection devices may include electronic whiteboards, holographic display devices, and any other suitable devices for displaying graphical content. Projector 110 and projector screen 112 may include one or more communication units that enable the respective devices to communicate with computing device 90. In some examples, the one or more communication units may enable communication between projector 110 and projector screen 112. Projector 110 may receive data from computing device 90 that includes graphical content. Projector 110, in response to receiving the data, may project the graphical content onto projector screen 112. In some examples, projector 110 may determine one or more user inputs (e.g., continuous gestures, multi-touch gestures, single-touch gestures, etc.) at projector screen using optical recognition or other suitable techniques and send indications of such user input using one or more communication units to computing device 90. In such examples, projector screen 112 may be unnecessary, and projector 110 may project graphical content on any suitable medium and detect one or more user inputs using optical recognition or other such suitable techniques.

Projector screen 112, in some examples, may include a presence-sensitive display 114. Presence-sensitive display 114 may include a subset of functionality or all of the functionality of UID 10 as described in this disclosure. In some examples, presence-sensitive display 94 may include additional functionality. Projector screen 112 (e.g., an electronic whiteboard) may receive data from computing device 90 and display the graphical content. In some examples, presence-sensitive display 114 may determine one or more user inputs (e.g., continuous gestures, multi-touch gestures, single-touch gestures, etc.) at projector screen 112 using capacitive, inductive, and/or optical recognition techniques and send indications of such user input using one or more communication units to computing device 90.

FIG. 4 also illustrates mobile device 116 and visual display device 120. Mobile device 116 and visual display device 120 may each include computing and connectivity capabilities. Examples of mobile device 116 may include e-reader devices, convertible notebook devices, hybrid slate devices, wearable computing devices, etc. Examples of visual display device 120 may include other semi-stationary devices such as televisions, computer monitors, etc. As shown in FIG. 4, mobile device 116 may include a presence-sensitive display 118. Visual display device 120 may include a presence-sensitive display 122. Presence-sensitive displays 118, 122 may include a subset of functionality or all of the functionality of UID 10 as described in this disclosure. In some examples, presence-sensitive displays 118, 122 may include additional functionality. In any case, presence-sensitive display 122, for example, may receive data from computing device 90 and display the graphical content. In some examples, presence-sensitive display 122 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 90.

As described above, in some examples, computing device 90 may output graphical content for display at presence-sensitive display 94 that is coupled to computing device 90 by a system bus or other suitable communication channel. Computing device 90 may also output graphical content for display at one or more remote devices, such as projector 110, projector screen 112, mobile device 116, and visual display device 120. For instance, computing device 90 may execute one or more instructions to generate and/or modify graphical content in accordance with techniques of the present disclosure. Computing device 90 may output the data that includes the graphical content to a communication unit of computing device 90, such as communication unit 100. Communication unit 100 may send the data to one or more of the remote devices, such as projector 110, projector screen 112, mobile device 116, and/or visual display device 120. In this way, computing device 90 may output the graphical content for display at one or more of the remote devices. In some examples, one or more of the remote devices may output the graphical content at a presence-sensitive display that is included in and/or operatively coupled to the respective remote devices.

In some examples, computing device 90 may not output graphical content at presence-sensitive display 94 that is operatively coupled to computing device 90. In other examples, computing device 90 may output graphical content for display at both a presence-sensitive display 94 that is coupled to computing device 90 by communication channel 92A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 90 and output for display at presence-sensitive display 94 may be different than graphical content display output for display at one or more remote devices.

Computing device 90 may send and receive data using any suitable communication techniques. For example, computing device 90 may be operatively coupled to external network 104 using network link 102A. Each of the remote devices illustrated in FIG. 4 may be operatively coupled to network external network 104 by one of respective network links 102B, 102C, and 102D. External network 104 may include network hubs, network switches, network routers, etc., that are operatively inter-coupled thereby providing for the exchange of information between computing device 90 and the remote devices illustrated in FIG. 4. In some examples, network links 102A-102D may be Ethernet, ATM or other network connections. Such connections may be wireless and/or wired connections.

In some examples, computing device 90 may be operatively coupled to one or more of the remote devices included in FIG. 4 using direct device communication 108. Direct device communication 108 may include communications through which computing device 90 sends and receives data directly with a remote device, using wired or wireless communication. That is, in some examples of direct device communication 108, data sent by computing device 90 may not be forwarded by one or more additional devices before being received at the remote device, and vice-versa. Examples of direct device communication 108 may include Bluetooth, Near-Field Communication, Universal Serial Bus, Wi-Fi, infrared, etc. One or more of the remote devices illustrated in FIG. 4 may be operatively coupled with computing device 90 by communication links 106A-106D. In some examples, communication links 106A-106D may be connections using Bluetooth, Near-Field Communication, Universal Serial Bus, infrared, etc. Such connections may be wireless and/or wired connections.

In accordance with techniques of the disclosure, computing device 90 may be operatively coupled to visual display device 120 using external network 104. A sensor control module of computing device 90 may determine, based on motion data generated by a motion sensor, a plurality of values. Responsive to determining that each the plurality of values satisfies a corresponding threshold, computing device 90 may send a signal to a display that causes the display to transition from operating in a low-power mode to operating in a higher-power mode. For example, computing device 90 may a signal to display device 96 of presence-sensitive display 94, projector 110, presence-sensitive display 118 of mobile device 116, and/or presence-sensitive display 122 of visual display device 120 that causes display device 96 of presence-sensitive display 94, projector 110, presence-sensitive display 118 of mobile device 116, and/or presence-sensitive display 122 of visual display device 120 to transition from operating in a low-power mode to operating in a higher-power mode.

Figure 5:
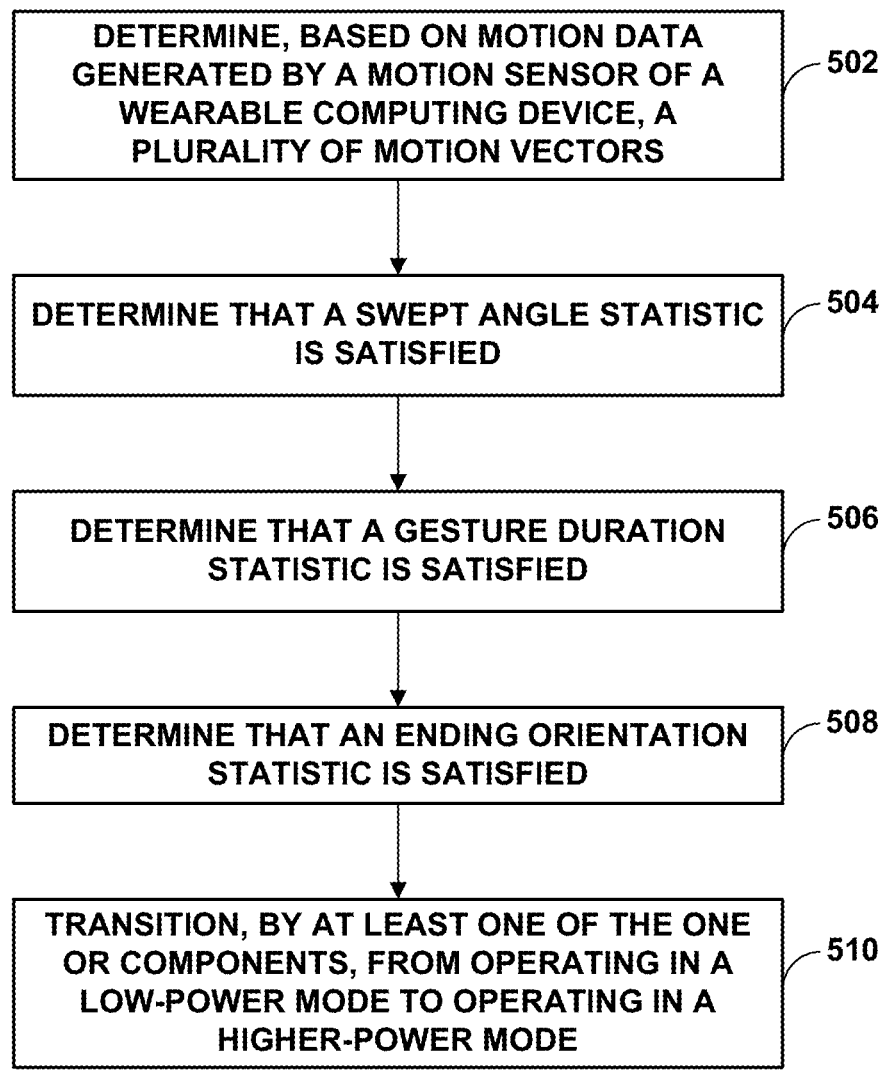
FIG. 5 is a flow diagram illustrating example operations of a wearable computing device that transitions between power modes based on motion data, in accordance with one or more techniques of the present disclosure.

FIG. 5 is a flow diagram illustrating example operations of a wearable computing device that transitions between power modes based on motion data, in accordance with one or more techniques of the present disclosure. The techniques of FIG. 5 may be performed by one or more processors of a computing device, such as wearable computing device 4 illustrated in FIG. 1 and FIG. 2. For purposes of illustration, the techniques of FIG. 5 are described within the context of wearable computing device 4 of FIG. 1 and FIG. 2, although computing devices having configurations different than that of wearable computing device 4 may perform the techniques of FIG. 5.

In accordance with one or more techniques of the disclosure, one or more processors 24 of sensor control module 8 of wearable computing device 4 may determine, based on motion data generated by a motion sensor of sensors 10 (e.g., accelerometer 32), a plurality of motion vectors (502). The motion data generated by the motion sensor of sensors 10 indicates movement of wearable computing device 4 during a first time period. Typically, one or more components of wearable computing device 4, such as application processors 14 and/or UID 12, operate in a low power mode during the first time period. In general, application processors 14 and/or UID 12 consume less power while operating in the low power mode than while operating in the higher power mode.

The one or more of processors 24 may determine that a swept angle value is satisfied (504). As discussed above, the one or more of processors 24 may determine that the swept angle value is satisfied if an angle between a first motion vector of the plurality of motion vectors and a second motion vector of the plurality of motion vectors is greater than a threshold, which may be 60 degrees. In some examples, the first motion vector may correspond to a first time and the second motion vector may correspond to a second time that may be later than the first time.

The one or more of processors 24 may determine that a gesture duration value is satisfied (506). As discussed above, the one or more of processors 24 may determine that the gesture duration value is satisfied if a time difference between a first time corresponding to the first motion vector and a second time corresponding to the second motion vector is greater than a threshold, which may be 650 milliseconds.

The one or more of processors 24 may determine that an ending orientation value is satisfied (508). As discussed above, the one or more of processors 24 may determine that the ending orientation value is satisfied if an angle between a plane parallel to a display of the wearable computing device and a plane perpendicular to a gravity vector satisfies a second threshold, which may be a range of 20 to 30 degrees.

The one or more of processors 24 may cause at least one of the one or more components to transition from operating in a low-power mode to operating in a higher-power mode (510). As discussed above, responsive to determining that the first angle satisfies the first threshold, that the time difference satisfies the threshold amount of time, and that the second angle satisfies the second threshold, the one or more of processors 24 may output an interrupt to application processor 14 and/or the display of UID 12 that causes application processor 14 and/or the display of UID 12 to transition from operating in a low-power mode to operating in a higher power operating state.

Figure 6:
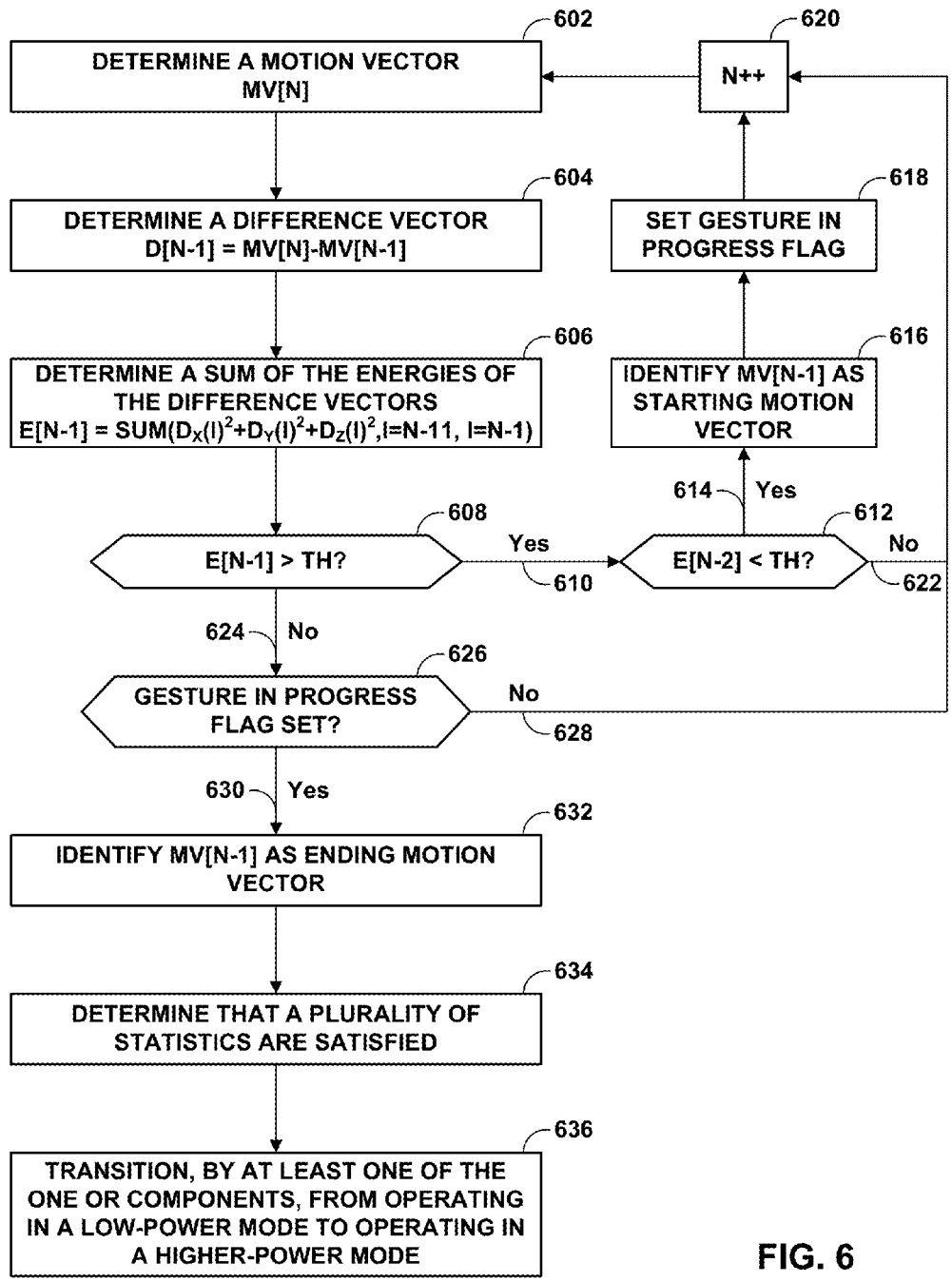
FIG. 6 is a flow diagram illustrating example operations of a wearable computing device that transitions between power modes based on motion data, in accordance with one or more techniques of the present disclosure.

FIG. 6 is a flow diagram illustrating example operations of a wearable computing device that transitions between power modes based on motion data, in accordance with one or more techniques of the present disclosure. The techniques of FIG. 6 may be performed by one or more processors of a computing device, such as wearable computing device 4 illustrated in FIG. 1 and FIG. 2. For purposes of illustration, the techniques of FIG. 6 are described within the context of wearable computing device 4 of FIG. 1 and FIG. 2, although computing devices having configurations different than that of wearable computing device 4 may perform the techniques of FIG. 6.

In accordance with one or more techniques of the disclosure, one or more of processors 24 of sensor control module 8 of wearable computing device 4 may determine, based on motion data generated by a motion sensor of sensors 10 (e.g., accelerometer 32), a motion vector (602). The motion data generated by the motion sensor of sensors 10 indicates movement of wearable computing device 4 during a first time period. Typically, one or more components of wearable computing device 4, such as application processors 14 and/or UID 12, operate in a low power mode during the first time period. In general, application processors 14 and/or UID 12 consume less power while operating in the low power mode than while operating in the higher power mode.

One or more processors 24 may determine a difference vector (604). In some examples, the techniques illustrated by FIG. 6 may be in operation prior to time N. As such, one or more processors 24 may have determined motion vectors, difference vectors, and energy values associated with times before time N. For instance, one or more processors 24 may subtract a motion vector associated with time N−1 from a motion vector associated with time N.

One or more processors 24 may determine a sum of the energies (i.e., an energy value) of a subset of the determined difference vectors (606). As discussed above, one or more processors 24 may determine a sum of the energies of a subset that includes ten of the determined difference vectors.

One or more processors 24 may determine whether the determined energy value associated with time N−1 satisfies an energy threshold (608). If the determined energy value is greater than the energy threshold (610), one or more processors 24 may determine whether the determined energy value associated with a previous pass (i.e., the determined energy value associated with time N−2) satisfied the energy threshold (612). If the determined energy value associated with the previous pass was not less than the energy threshold (622), one or more processors 24 may increment N (620) and determine a motion vector associated with time N+1 (602). If the determined energy value associated with the previous pass was less than the energy threshold (614), one or more processors 24 may identify the motion vector associated with time N−1 as a starting motion vector (616) and set a flag that indicates that a potential gesture may be in progress (618). One or more processors 24 may increment N (620) and determine a motion vector associated with time N+1 (602).

If the determined energy value is not greater than the energy threshold (624), one or more processors 24 may determine whether the flag that indicates that a potential gesture may be in progress is set (626). If the flag is not set (628), one or more processors 24 may increment N (620) and determine a motion vector associated with time N+1 (602). If the flag is set (630), one or more processors 24 may identify the motion vector associated with time N−1 as an ending motion vector (632).

One or more processors 24 may determine that each of a plurality of values satisfies a corresponding threshold (632). As discussed above, one or more processors 24 may determine that a swept angle value is satisfied based on an angle between the starting motion vector identified at operation 616 and the ending motion vector identified at operation 632 satisfies a threshold.

One or more processors 24 may cause at least one of the one or more components of wearable computing device 4 to transition from operating in a low-power mode to operating in a higher-power mode (636). As discussed above, one or more processors 24 may send an interrupt signal to application processor 14 of wearable computing device 4 that causes application processor 14 to transition from operating in a low-power mode to operating in a higher-power mode.

Figure 7:
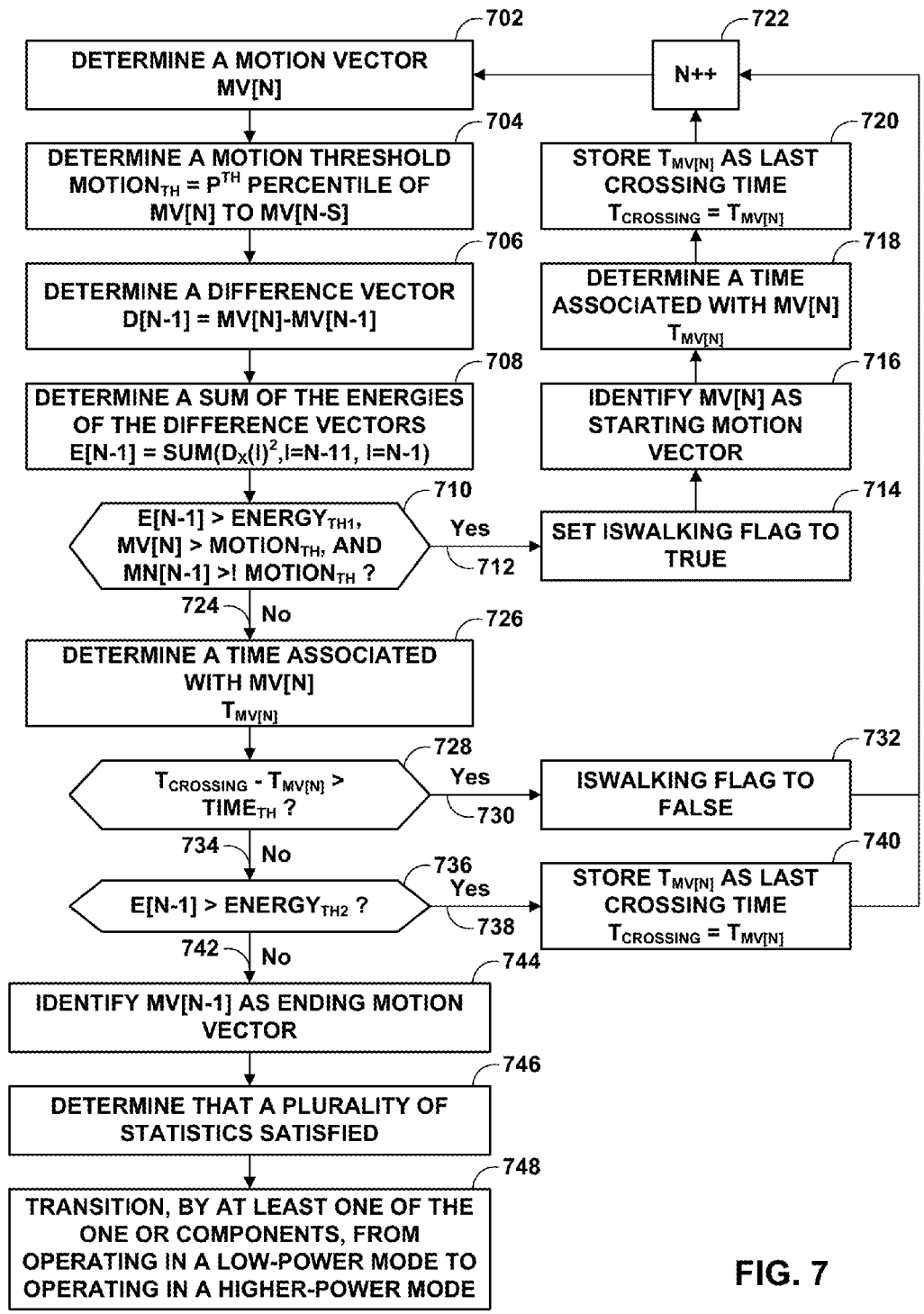
FIG. 7 is a flow diagram illustrating example operations of a wearable computing device that transitions between power modes based on motion data, in accordance with one or more techniques of the present disclosure.

FIG. 7 is a flow diagram illustrating example operations of a wearable computing device that transitions between power modes based on motion data, in accordance with one or more techniques of the present disclosure. The techniques of FIG. 7 may be performed by one or more processors of a computing device, such as wearable computing device 4 illustrated in FIG. 1 and FIG. 2. For purposes of illustration, the techniques of FIG. 7 are described within the context of wearable computing device 4 of FIG. 1 and FIG. 2, although computing devices having configurations different than that of wearable computing device 4 may perform the techniques of FIG. 7.

In accordance with one or more techniques of the disclosure, one or more of processors 24 of sensor control module 8 of wearable computing device 4 may determine, based on motion data generated by a motion sensor of sensors 10 (e.g., accelerometer 32), a motion vector (702). The motion data generated by the motion sensor of sensors 10 indicates movement of wearable computing device 4 during a first time period. Typically, one or more components of wearable computing device 4, such as application processors 14 and/or UID 12, operate in a low power mode during the first time period. In general, application processors 14 and/or UID 12 consume less power while operating in the low power mode than while operating in the higher power mode.

One or more processors 24 may determine a motion threshold (704). In some examples, the techniques illustrated by FIG. 7 may be in operation prior to time N. As such, one or more processors 24 may have determined motion vectors, difference vectors, and energy values associated with times before time N. In some examples, one or more processors 24 may determine the motion threshold by determining the $P^{th}$ percentile of the most recent S motion vectors. For instance, one or more processors 24 may determine the motion threshold as the $70^{th}$ percentile of the 300 most recent motion vectors. In some examples, one or more processors 24 may determine the motion threshold based on a particular axial component of the motion vectors. For instance, one or more processors 24 may determine the motion threshold based on an X-axial component of the motion vectors.

One or more processors 24 may determine a difference vector (706). As discussed above, one or more processors 24 may have determined motion vectors, difference vectors, and energy values associated with times before time N. In some examples, one or more processors 24 may determine the difference vector D[N−1] by subtracting a motion vector associated with time N−1 from a motion vector associated with time N.

One or more processors 24 may determine a sum of the energies (i.e., an energy value) of a subset of the determined difference vectors (708). As discussed above, one or more processors 24 may determine a sum of the energies of a subset that includes ten of the determined difference vectors. In some examples, one or more processors 24 may determine the sum of the energies based on a particular axial component of the difference vectors. For instance, one or more processors 24 may determine the sum of the energies based on an X-axial component of the difference vectors.

One or more processors 24 may determine whether the determined energy value associated with time N−1 satisfies a first energy threshold, whether the motion vector associated with time N satisfies the motion threshold, and whether the motion vector associated with time N−1 satisfies the motion threshold (710). If the three thresholds are satisfied (i.e., if the determined energy value associated with time N−1 satisfies the first energy threshold, the motion vector associated with time N satisfies the motion threshold, and the motion vector associated with time N−1 satisfies the motion threshold) (712), one or more processors 24 may set a flag that indicates whether or not a user of wearable computing device 4 is walking to true (714), identify the motion vector associated with time N as a starting motion vector (716), determine the time associated with the current motion vector (718), store the time associated with the current motion vector as a last crossing time (720), increment N (722), and determine a motion vector associated with time N+1 (702).

If the three thresholds are not satisfied (724), one or more processors 24 may determine a time associated with the current motion vector (726), and determine whether or not a difference between the time associated with the current motion vector and the stored last crossing time satisfies a threshold (728). If the difference between the time associated with the current motion vector and the stored last crossing time satisfies the threshold (730), one or more processors 24 may set a flag that indicates whether or not a user of wearable computing device 4 is walking to false (732), increment N (722), and determine a motion vector associated with time N+1 (702).

If the difference between the time associated with the current motion vector and the stored last crossing time does not satisfy the threshold (734), one or more processors 24 may determine whether or not the determined energy value associated with time N−1 satisfies a second energy threshold (736). If the determined energy value associated with time N−1 satisfies the second energy threshold (738), one or more processors 24 may store the time associated with the current motion vector as the last crossing time (740), increment N (722), and determine a motion vector associated with time N+1 (702). If the determined energy value associated with time N−1 does not satisfy the second energy threshold (742), one or more processors 24 may identify the motion vector associated with time N as an ending motion vector (744).

One or more processors 24 may determine that each of a plurality of values satisfies a corresponding threshold (746). As discussed above, one or more processors 24 may determine that a swept angle value is satisfied based on an angle between the starting motion vector identified at operation 716 and the ending motion vector identified at operation 744 satisfies an angular threshold, that a time difference between a time associated with the starting motion vector identified at operation 716 and a time associated with the ending motion vector identified at operation 744 satisfies a threshold amount of time, and that the ending motion vector identified at operation 744 indicates that it is possible for the user to view wearable computing device 4.

One or more processors 24 may cause at least one of the one or more components of wearable computing device 4 to transition from operating in a low-power mode to operating in a higher-power mode (748). As one example, one or more processors 24 may send an interrupt signal to application processor 14 of wearable computing device 4 that causes application processor 14 to transition from operating in a low-power mode to operating in a higher-power mode. As another example, one or more processors 24 may send an interrupt signal to a display of UID 12 of wearable computing device 4 that causes the display of UID 12 to transition from operating in a low-power mode to operating in a higher-power mode.

Example 1

A method comprising: determining, by a processor of a wearable computing device and based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period; determining, by the processor, that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time; determining, by the processor, that a time difference between the first time and the second time satisfies a threshold amount of time; determining, by the processor, that a second angle between a plane parallel to a display of the wearable computing device and a plane perpendicular to a gravity vector satisfies a second angular threshold; and responsive to determining that the first angle satisfies the first angular threshold, that the time difference satisfies the threshold amount of time, and that the second angle satisfies the second angular threshold, transitioning, by at least one component of the one or more components, from operating in the first power mode to operating in a second power mode, wherein the at least one component consumes more power while operating in the second power mode than while operating in the first power mode.

Example 2

The method of example 1, further comprising: determining a plurality of difference vectors, wherein each respective difference vector from the plurality of difference vectors is based on a respective difference between at least two respective motion vectors from the plurality of motion vectors; determining, based on a first subset of the plurality of difference vectors, a first energy value; responsive to determining that the first energy value satisfies an energy threshold, determining that a particular difference vector from the first subset is based on the first motion vector; determining, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and responsive to determining that the second energy value does not satisfy the energy threshold and that the particular difference vector from the first subset is based on the first motion vector, determining that a particular difference vector from the second subset and not from the first subset is based on the second motion vector.

Example 3

The method of any combination of examples 1-2, wherein the first subset and the second subset include a same number of difference vectors.

Example 4

The method of any combination of examples 1-3, wherein: determining the first energy value comprises determining a sum of the squared norms of each difference vector from the first subset, and determining the second energy value comprises determining a sum of the squared norms of each difference vector from the second subset.

Example 5

The method of any combination of examples 1-4, wherein each motion vector from the plurality of motion vectors is a respective filtered motion vector determined based on a moving average of a plurality of unfiltered motion vectors, the plurality of unfiltered motion vectors being determined based on the motion data.

Example 6

The method of any combination of examples 1-5, wherein: the motion sensor includes an accelerometer, and the wearable computing device does not include a gyroscope.

Example 7

The method of any combination of examples 1-6, wherein the one or more components include at least one of: a display; and an application processor, wherein the application processor is not the processor.

Example 8

The method of any combination of examples 1-7, wherein transitioning, by the at least one component of the one or more components, from operating in the first power mode to operating in the second power mode comprises activating the display.

Example 9

The method of any combination of examples 1-8, further comprising: responsive to determining that the first angle satisfies the first angular threshold, that the time difference satisfies the threshold amount of time, and that the second angle satisfies the second angular threshold, determining, by the processor, that a user of the wearable computing device is likely viewing the wearable computing device.

Example 10

The method of any combination of examples 1-9, wherein the threshold amount of time is a first threshold amount of time, the method further comprising: determining that a particular value of a current motion vector of the plurality of motion vectors satisfies a motion threshold; determining that a particular value of a previous motion vector of the plurality of motion vectors does not satisfy the motion threshold, wherein the particular value of the current motion vector and the particular value of the previous motion vector are both associated with a particular axis of motion; determining a plurality of difference vectors, wherein each respective difference vector from the plurality of difference vectors is based on a respective difference between at least two respective motion vectors from the plurality of motion vectors; determining that a first energy value based on a first subset of the plurality of difference vectors satisfies a first energy threshold; responsive to determining that the particular value of the current motion vector satisfies the motion threshold, that the particular value of the previous motion vector does not satisfy the motion threshold, and that the first energy value satisfies the first energy threshold, determining that the current motion vector is the first motion vector and that a user of the wearable computing device is walking at the first time; determining, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and responsive to determining that the second energy value does not satisfy a second energy threshold, determining that a particular difference vector from the second subset and not from the first subset is based on the second motion vector.

Example 11

The method of any combination of examples 1-10, wherein a difference vector from the plurality of difference vectors included in the second subset but not included in the first subset is associated with a third time, the method further comprising: responsive to determining that a time difference between the first time and the third time satisfies a second threshold amount of time, determining that the user of the wearable computing device is still walking at the third time, wherein the third time is later than the first time; responsive to determining that the user of the wearable computing device is still walking at the third time, determining whether or not the second energy value satisfies the second energy threshold.

Example 12

The method of any combination of examples 1-11, further comprising: determining the first energy value based on values of the first set of difference vectors; and determining the second energy value based on values of the second set of difference vectors, wherein the values of the first set of difference vectors the values of the second set of difference vectors are both associated with the particular axis of motion.

Example 13

The method of any combination of examples 1-12, further comprising: determining, based on values of a set of the plurality of motion vectors that are associated with the particular axis of motion, the motion threshold.

Example 14

A computing device comprising: a plurality of processors including: a first motion processor; and an application processor; a motion sensor; a display; and at least one module executable by at least one of the plurality of processors to: determine, based on motion data generated by the motion sensor, a plurality of motion vectors, wherein one or more components of the computing device are operating in a first power mode during a first time period, and wherein the motion data indicates movement of the computing device during the first time period; determine that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time; determine that a time difference between the first time and the second time satisfies a threshold amount of time; determine that a second angle between a plane parallel to the display and a plane perpendicular to a gravity vector satisfies a second angular threshold; and responsive to determining that the first angle satisfies the first angular threshold, that the time difference satisfies the threshold amount of time, and that the second angle satisfies the second angular threshold, cause at least one component of the one or more components to transition, from operating in the first power mode to operating in a second power mode, wherein the at least one component consumes more power while operating in the second power mode than while operating in the first power mode.

Example 15

The computing device of example 14, wherein the at least one module is further executable by the at least one processor to: determine a plurality of difference vectors, wherein each respective difference vector from the plurality of difference vectors is based on a respective difference between at least two respective motion vectors from the plurality of motion vectors; determine, based on a first subset of the plurality of difference vectors, a first energy value; responsive to determining that the first energy value satisfies an energy threshold, determine that a particular difference vector from the first subset is based on the first motion vector; determine, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first set; and responsive to determining that the second energy value does not satisfy the energy threshold and that the particular difference vector from the first subset is based on the first motion vector, determine that a particular difference vector from the second subset and not from the first subset is based on the second motion vector.

Example 16

The computing device of any combination of examples 14-15, wherein the first subset and the second subset include a same number of difference vectors.

Example 17

The computing device of any combination of examples 14-16, wherein: the at least one module is executable by the at least one processor to determine the first energy value by at least determining a sum of the squared norms of each difference vector from the first subset, and the at least one module is executable by the at least one processor to determine the second energy value by at least determining a sum of the squared norms of each difference vector from the second subset.

Example 18

The computing device of any combination of examples 14-17, wherein each motion vector from the plurality of motion vectors is a respective filtered motion vector determined based on a moving average of unfiltered motion vectors, the plurality of unfiltered motion vectors being determined based on the motion data.

Example 19

The computing device of any combination of examples 14-18, wherein: the motion sensor includes an accelerometer, and the computing device does not include a gyroscope.

Example 20

The computing device of any combination of examples 14-19, wherein the one or more components include at least one of: the display; and the application processor.

Example 21

The computing device of any combination of examples 14-20, wherein the at least one module is executable by the at least one processor to transition, by the at least one component of the one or more components, from operating in the first power mode to operating in the second power mode by at least activating the display.

Example 22

The computing device of any combination of examples 14-21, wherein the at least one module is further executable by the at least one processor to: responsive to determining that the first angle satisfies the first angular threshold, that the time difference satisfies the threshold amount of time, and that the second angle satisfies the second angular threshold, determine, that a user of the computing device is likely viewing the computing device.

Example 23

The computing device of any combination of examples 14-22, wherein the threshold amount of time is a first threshold amount of time, wherein the at least one module is further executable by the at least one processor to: determine that a particular value of a current motion vector of the plurality of motion vectors satisfies a motion threshold; determine that a particular value of a previous motion vector of the plurality of motion vectors does not satisfy the motion threshold, wherein the particular value of the current motion vector and the particular value of the previous motion vector are both associated with a particular axis of motion; determine a plurality of difference vectors, wherein each respective difference vector from the plurality of difference vectors is based on a respective difference between at least two respective motion vectors from the plurality of motion vectors; determine that a first energy value based on a first subset of the plurality of difference vectors satisfies a first energy threshold; responsive to determining that the particular value of the current motion vector satisfies the motion threshold, that the particular value of the previous motion vector does not satisfy the motion threshold, and that the first energy value satisfies the first energy threshold, determine that the current motion vector is the first motion vector and that a user of the wearable computing device is walking at the first time; determine, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and responsive to determining that the second energy value does not satisfy a second energy threshold, determine that a particular difference vector from the second subset and not from the first subset is based on the second motion vector.

Example 24

The computing device of any combination of examples 14-23, wherein a difference vector from the plurality of difference vectors included in the second subset but not included in the first subset is associated with a third time, and wherein the at least one module is executable by the at least one processor to: responsive to determining that a time difference between the first time and the third time satisfies a second threshold amount of time, determine that the user of the wearable computing device is still walking at the third time, wherein the third time is later than the first time; responsive to determining that the user of the wearable computing device is still walking at the third time, determine whether or not the second energy value satisfies the second energy threshold.

Example 25

The computing device of any combination of examples 14-24, wherein the at least one module is executable by the at least one processor to: determine the first energy value based on values of the first set of difference vectors; and determine the second energy value based on values of the second set of difference vectors, wherein the values of the first set of difference vectors the values of the second set of difference vectors are both associated with the particular axis of motion.

Example 26

The computing device of any combination of examples 14-25, wherein the at least one module is executable by the at least one processor to: determine, based on values of a set of the plurality of motion vectors that are associated with the particular axis of motion, the motion threshold.

Example 27

A non-transitory computer-readable storage medium storing instructions that, when executed, cause at least one processor of a plurality of processors of a computing device to: determine, based on motion data generated by a motion sensor of the computing device, a plurality of motion vectors, wherein one or more components operatively coupled to the computing device are operating in a first power mode during a first time period, and wherein the motion data indicates movement of the computing device during the first time period; determine that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time; determine that a time difference between the first time and the second time satisfies a threshold amount of time; determine that a second angle between a plane parallel to a display of the computing device and a plane perpendicular to a gravity vector satisfies a second angular threshold; and responsive to determining that the first angle satisfies the first angular threshold, that the time difference satisfies the threshold amount of time, and that the second angle satisfies the second angular threshold, at least one component of the one or more components to transition, from operating in the first power mode to operating in a second power mode, wherein the at least one component consumes more power while operating in the second power mode than while operating in the first power mode.

Example 28

The non-transitory computer-readable storage medium of example 27, further storing instructions that, when executed, cause the at least one processor to: determine a plurality of difference vectors, wherein each respective difference vector from the plurality of difference vectors is based on a respective difference between at least two respective motion vectors from the plurality of motion vectors; determine, based on a first subset of the plurality of difference vectors, a first energy value; responsive to determining that the first energy value satisfies an energy threshold, determine that a particular difference vector from the first subset is based on the first motion vector; determine, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and responsive to determining that the second energy value does not satisfy the energy threshold and that the particular difference vector from the first subset is based on the first motion vector, determine that a particular difference vector from the second subset and not from the first subset is based on the second motion vector.

Example 29

The non-transitory computer-readable storage medium of any combination of examples 27-28, wherein the first subset and the second subset include a same number of difference vectors.

Example 30

The non-transitory computer-readable storage medium of any combination of examples 27-29, wherein: the instructions that cause the at least one processor to determine the first energy value comprise instructions that cause the at least one processor to determine a sum of the squared norms of each difference vector from the first subset, and the instructions that cause the at least one processor to determine the second energy value comprise instructions that cause the at least one processor to determine a sum of the squared norms of each difference vector from the second subset.

Example 31

The non-transitory computer-readable storage medium of any combination of examples 27-30, wherein each motion vector from the plurality of motion vectors is a respective filtered motion vector determined based on a moving average of a plurality of unfiltered motion vectors, the plurality of unfiltered motion vectors being determined based on the motion data.

Example 32

The non-transitory computer-readable storage medium of any combination of examples 27-31, wherein: the motion sensor includes an accelerometer, and the computing device does not include a gyroscope.

Example 33

The non-transitory computer-readable storage medium of any combination of examples 27-32, wherein the one or more components include at least one of: a display; and an application processor, wherein the application processor is not the at least one processor.

Example 34

The non-transitory computer-readable storage medium of any combination of examples 27-33, further storing instructions that, when executed, cause the at least one processor to: responsive to determining that the first angle satisfies the first angular threshold, that the time difference satisfies the threshold amount of time, and that the second angle satisfies the second angular threshold, determine that a user of the computing device is likely viewing the computing device.

Example 35

A computing device comprising: means for determining, based on motion data generated by a motion sensor of the computing device, a plurality of motion vectors, wherein one or more components operatively coupled to the computing device are operating in a first power mode during a first time period, and wherein the motion data indicates movement of the computing device during the first time period; means for determining that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time; means for determining that a time difference between the first time and the second time satisfies a threshold amount of time; means for determining that a second angle between a plane parallel to a display of the computing device and a plane perpendicular to a gravity vector satisfies a second angular threshold; and means for transitioning, responsive to determining that the first angle satisfies the first angular threshold, that the time difference satisfies the threshold amount of time, and that the second angle satisfies the second angular threshold, by at least one component of the one or more components, from operating in the first power mode to operating in a second power mode, wherein the at least one component consumes more power while operating in the second power mode than while operating in the first power mode.

Example 36

The computing device of example 35, further comprising means for performing any combination of the methods of examples 1-12.

Example 37

A method comprising: determining, by a processor of a wearable computing device and based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period; responsive to determining, by the processor, that a first energy value based on a first subset of the plurality of motion vectors satisfies a first energy threshold, determining that a particular motion vector from the first subset is a starting motion vector; responsive to determining, by the processor, that a second energy value based on a second subset of the plurality of motion vectors satisfies a second energy threshold, determining that a particular motion vector from the second subset is an ending motion vector, wherein the first subset includes at least one motion vector from the plurality of motion vectors not included in the second subset, and wherein the second subset includes at least one motion vector from the plurality of motion vectors not included in the first subset; and responsive to determining, by the processor, that a difference between the first motion vector and the second motion vector indicates that a user of the wearable computing device is viewing the wearable computing device, transitioning, by at least one component of the one or more components, from operating in the first power mode to operating in a second power mode, wherein the at least one component consumes more power while operating in the second power mode than while operating in the first power mode.

Example 38

The method of example 37, wherein determining, by the processor, that a difference between the first motion vector and the second motion vector indicates that a user of the wearable computing device is viewing the wearable computing device comprises: determining, by the processor, that a first angle between the first motion vector and the second motion vector satisfies a first angular threshold, wherein the first motion vector is associated with a first time, wherein the second motion vector is associated with a second time, and wherein the second time is later than the first time; determining, by the processor, that a time difference between the first time and the second time satisfies a threshold amount of time; and determining, by the processor, that a second angle between a plane parallel to a display of the wearable computing device and a plane perpendicular to a gravity vector satisfies a second angular threshold.

Example 39

A computing device configured to perform any combination of the methods of examples 37-38.

Example 40

A device comprising means for performing any combination of the methods of examples 37-38.

Example 41

A computer-readable storage medium storing instructions that, when executed, cause one or more processors of a computing device to perform any combination of the methods of examples 37-38.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    determining, by a processor of a wearable computing device and based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period;
    determining, by the processor, that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time;
    determining, by the processor, that a time difference between the first time and the second time satisfies a threshold amount of time;
    determining, by the processor, that a second angle between a plane parallel to a display of the wearable computing device and a plane perpendicular to a gravity vector satisfies a second angular threshold; and
    responsive to determining that the first angle satisfies the first angular threshold, that the time difference satisfies the threshold amount of time, and that the second angle satisfies the second angular threshold, transitioning, by at least one component of the one or more components, from operating in the first power mode to operating in a second power mode, wherein the at least one component consumes more power while operating in the second power mode than while operating in the first power mode.

2. The method of claim 1, further comprising:
    determining a plurality of difference vectors, wherein each respective difference vector from the plurality of difference vectors is based on a respective difference between at least two respective motion vectors from the plurality of motion vectors;
    determining, based on a first subset of the plurality of difference vectors, a first energy value;
    responsive to determining that the first energy value satisfies an energy threshold, determining that a particular difference vector from the first subset is based on the first motion vector;
    determining, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and
    responsive to determining that the second energy value does not satisfy the energy threshold and that the particular difference vector from the first subset is based on the first motion vector, determining that a particular difference vector from the second subset and not from the first subset is based on the second motion vector.

3. The method of claim 2, wherein the first subset and the second subset include a same number of difference vectors.

4. The method of claim 2, wherein:
    determining the first energy value comprises determining a sum of the squared norms of each difference vector from the first subset, and
    determining the second energy value comprises determining a sum of the squared norms of each difference vector from the second subset.

5. The method of claim 1, wherein each motion vector from the plurality of motion vectors is a respective filtered motion vector determined based on a moving average of a plurality of unfiltered motion vectors, the plurality of unfiltered motion vectors being determined based on the motion data.

6. The method of claim 1, wherein:
    the motion sensor includes an accelerometer, and
    the wearable computing device does not include a gyroscope.

7. The method of claim 1, wherein the one or more components include at least one of:
    a display; and
    an application processor, wherein the application processor is not the processor.

8. The method of claim 7, wherein transitioning, by the at least one component of the one or more components, from operating in the first power mode to operating in the second power mode comprises activating the display.

9. The method of claim 1, further comprising:
    responsive to determining that the first angle satisfies the first angular threshold, that the time difference satisfies the threshold amount of time, and that the second angle satisfies the second angular threshold, determining, by the processor, that a user of the wearable computing device is likely viewing the wearable computing device.

10. The method of claim 1, wherein the threshold amount of time is a first threshold amount of time, the method further comprising:
    determining that a particular value of a current motion vector of the plurality of motion vectors satisfies a motion threshold;
    determining that a particular value of a previous motion vector of the plurality of motion vectors does not satisfy the motion threshold, wherein the particular value of the current motion vector and the particular value of the previous motion vector are both associated with a particular axis of motion;
    determining a plurality of difference vectors, wherein each respective difference vector from the plurality of difference vectors is based on a respective difference between at least two respective motion vectors from the plurality of motion vectors;
    determining that a first energy value based on a first subset of the plurality of difference vectors satisfies a first energy threshold;
    responsive to determining that the particular value of the current motion vector satisfies the motion threshold, that the particular value of the previous motion vector does not satisfy the motion threshold, and that the first energy value satisfies the first energy threshold, determining that the current motion vector is the first motion vector and that a user of the wearable computing device is walking at the first time;

determining, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and responsive to determining that the second energy value does not satisfy a second energy threshold, determining that a particular difference vector from the second subset and not from the first subset is based on the second motion vector.

11. The method of claim 10, wherein a difference vector from the plurality of difference vectors included in the second subset but not included in the first subset is associated with a third time, the method further comprising:

responsive to determining that a time difference between the first time and the third time satisfies a second threshold amount of time, determining that the user of the wearable computing device is still walking at the third time, wherein the third time is later than the first time;

responsive to determining that the user of the wearable computing device is still walking at the third time, determining whether or not the second energy value satisfies the second energy threshold.

12. The method of claim 10, further comprising:
determining the first energy value based on values of the first set of difference vectors; and
determining the second energy value based on values of the second set of difference vectors, wherein the values of the first set of difference vectors the values of the second set of difference vectors are both associated with the particular axis of motion.

13. The method of claim 10, further comprising:
determining, based on values of a set of the plurality of motion vectors that are associated with the particular axis of motion, the motion threshold.

14. A wearable computing device comprising:
a plurality of processors including:
a first motion processor; and
an application processor;
a motion sensor;
a display; and
a storage device storing at least one module, wherein the at least one module is executable by at least one of the plurality of processors to:
determine, based on motion data generated by the motion sensor, a plurality of motion vectors, wherein one or more components of the wearable computing device are operating in a first power mode during a first time period, and wherein the motion data indicates movement of the wearable computing device during the first time period;
determine that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time;
determine that a time difference between the first time and the second time satisfies a threshold amount of time;

determine that a second angle between a plane parallel to the display and a plane perpendicular to a gravity vector satisfies a second angular threshold; and responsive to determining that the first angle satisfies the first angular threshold, that the time difference satisfies the threshold amount of time, and that the second angle satisfies the second angular threshold, cause at least one component of the one or more components to transition, from operating in the first power mode to operating in a second power mode, wherein the at least one component consumes more power while operating in the second power mode than while operating in the first power mode.

15. The wearable computing device of claim 14, wherein the at least one module is further executable by the at least one processor to:
determine a plurality of difference vectors, wherein each respective difference vector from the plurality of difference vectors is based on a respective difference between at least two respective motion vectors from the plurality of motion vectors;
determine, based on a first subset of the plurality of difference vectors, a first energy value;
responsive to determining that the first energy value satisfies an energy threshold, determine that a particular difference vector from the first subset is based on the first motion vector;
determine, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first set; and
responsive to determining that the second energy value does not satisfy the energy threshold and that the particular difference vector from the first subset is based on the first motion vector, determine that a particular difference vector from the second subset and not from the first subset is based on the second motion vector.

16. The wearable computing device of claim 15, wherein the first subset and the second subset include a same number of difference vectors.

17. The wearable computing device of claim 15, wherein:
the at least one module is executable by the at least one processor to determine the first energy value by at least determining a sum of the squared norms of each difference vector from the first subset, and
the at least one module is executable by the at least one processor to determine the second energy value by at least determining a sum of the squared norms of each difference vector from the second subset.

18. The wearable computing device of claim 14, wherein each motion vector from the plurality of motion vectors is a respective filtered motion vector determined based on a moving average of unfiltered motion vectors, the plurality of unfiltered motion vectors being determined based on the motion data.

19. The wearable computing device of claim 14, wherein:
the motion sensor includes an accelerometer, and
the wearable computing device does not include a gyroscope.

20. The wearable computing device of claim 14, wherein the one or more components include at least one of:
the display; and
the application processor.

21. The wearable computing device of claim 20, wherein the at least one module is executable by the at least one processor to transition, by the at least one component of the one or more components, from operating in the first power mode to operating in the second power mode by at least activating the display.

22. The wearable computing device of claim 14, wherein the at least one module is further executable by the at least one processor to:
responsive to determining that the first angle satisfies the first angular threshold, that the time difference satisfies the threshold amount of time, and that the second angle satisfies the second angular threshold, determine, that a user of the wearable computing device is likely viewing the wearable computing device.

23. The wearable computing device of claim 14, wherein the threshold amount of time is a first threshold amount of time, wherein the at least one module is further executable by the at least one processor to:
determine that a particular value of a current motion vector of the plurality of motion vectors satisfies a motion threshold;
determine that a particular value of a previous motion vector of the plurality of motion vectors does not satisfy the motion threshold, wherein the particular value of the current motion vector and the particular value of the previous motion vector are both associated with a particular axis of motion;
determine a plurality of difference vectors, wherein each respective difference vector from the plurality of difference vectors is based on a respective difference between at least two respective motion vectors from the plurality of motion vectors;
determine that a first energy value based on a first subset of the plurality of difference vectors satisfies a first energy threshold;
responsive to determining that the particular value of the current motion vector satisfies the motion threshold, that the particular value of the previous motion vector does not satisfy the motion threshold, and that the first energy value satisfies the first energy threshold, determine that the current motion vector is the first motion vector and that a user of the wearable computing device is walking at the first time;
determine, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and
responsive to determining that the second energy value does not satisfy a second energy threshold, determine that a particular difference vector from the second subset and not from the first subset is based on the second motion vector.

24. The wearable computing device of claim 23, wherein a difference vector from the plurality of difference vectors included in the second subset but not included in the first subset is associated with a third time, and wherein the at least one module is executable by the at least one processor to:
responsive to determining that a time difference between the first time and the third time satisfies a second threshold amount of time, determine that the user of the wearable computing device is still walking at the third time, wherein the third time is later than the first time;
responsive to determining that the user of the wearable computing device is still walking at the third time, determine whether or not the second energy value satisfies the second energy threshold.

25. The wearable computing device of claim 23, wherein the at least one module is executable by the at least one processor to:
determine the first energy value based on values of the first set of difference vectors; and
determine the second energy value based on values of the second set of difference vectors, wherein the values of the first set of difference vectors the values of the second set of difference vectors are both associated with the particular axis of motion.

26. The wearable computing device of claim 23, wherein the at least one module is executable by the at least one processor to:
determine, based on values of a set of the plurality of motion vectors that are associated with the particular axis of motion, the motion threshold.

27. A non-transitory computer-readable storage medium storing instructions that, when executed, cause at least one processor of a wearable computing device to:
determine, based on motion data generated by a motion sensor of the wearable computing device, a plurality of motion vectors, wherein one or more components operatively coupled to the wearable computing device are operating in a first power mode during a first time period, and wherein the motion data indicates movement of the wearable computing device during the first time period;
determine that a first angle between a first motion vector of the plurality of motion vectors and a second motion vector of the plurality of motion vectors satisfies a first angular threshold, wherein the first motion vector is associated with a first time, wherein the second motion vector is associated with a second time, and wherein the second time is later than the first time;
determine that a time difference between the first time and the second time satisfies a threshold amount of time;
determine that a second angle between a plane parallel to a display of the wearable computing device and a plane perpendicular to a gravity vector satisfies a second angular threshold; and
responsive to determining that the first angle satisfies the first angular threshold, that the time difference satisfies the threshold amount of time, and that the second angle satisfies the second angular threshold, at least one component of the one or more components to transition, from operating in the first power mode to operating in a second power mode, wherein the at least one component consumes more power while operating in the second power mode than while operating in the first power mode.

28. The non-transitory computer-readable storage medium of claim 27, further storing instructions that, when executed, cause the at least one processor to:
determine a plurality of difference vectors, wherein each respective difference vector from the plurality of difference vectors is based on a respective difference between at least two respective motion vectors from the plurality of motion vectors;
determine, based on a first subset of the plurality of difference vectors, a first energy value;
responsive to determining that the first energy value satisfies an energy threshold, determine that a particular difference vector from the first subset is based on the first motion vector;

determine, based on a second subset of the plurality of difference vectors, a second energy value, wherein the first subset includes at least one difference vector from the plurality of difference vectors not included in the second subset, and wherein the second subset includes at least one difference vector from the plurality of difference vectors not included in the first subset; and responsive to determining that the second energy value does not satisfy the energy threshold and that the particular difference vector from the first subset is based on the first motion vector, determine that a particular difference vector from the second subset and not from the first subset is based on the second motion vector.

29. A method comprising:

determining, by a processor of a wearable computing device and based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period;

responsive to determining, by the processor, that a first energy value based on a first subset of the plurality of motion vectors satisfies a first energy threshold, determining that a particular motion vector from the first subset is a starting motion vector;

responsive to determining, by the processor, that a second energy value based on a second subset of the plurality of motion vectors satisfies a second energy threshold, determining that a particular motion vector from the second subset is an ending motion vector, wherein the first subset includes at least one motion vector from the plurality of motion vectors not included in the second subset, and wherein the second subset includes at least one motion vector from the plurality of motion vectors not included in the first subset; and responsive to determining, by the processor, that a difference between the starting motion vector and the ending motion vector indicates that a user of the wearable computing device is viewing the wearable computing device, transitioning, by at least one component of the one or more components, from operating in the first power mode to operating in a second power mode, wherein the at least one component consumes more power while operating in the second power mode than while operating in the first power mode.

30. The method of claim 29, wherein determining, by the processor, that the difference between the starting motion vector and the ending motion vector indicates that the user of the wearable computing device is viewing the wearable computing device comprises:

determining, by the processor, that a first angle between the starting motion vector and the ending motion vector satisfies a first angular threshold, wherein the starting motion vector is associated with a first time, wherein the ending motion vector is associated with a second time, and wherein the second time is later than the first time;

determining, by the processor, that a time difference between the first time and the second time satisfies a threshold amount of time; and determining, by the processor, that a second angle between a plane parallel to a display of the wearable computing device and a plane perpendicular to a gravity vector satisfies a second angular threshold.

31. A wearable computing device comprising:
a plurality of processors including:
a first motion processor; and
an application processor;
a motion sensor;
a display; and
a storage device storing at least one module, wherein the at least one module is executable by at least one of the plurality of processors to:

determine, based on motion data generated by the motion sensor, a plurality of motion vectors, wherein one or more components of the wearable computing device are operating in a first power mode during a first time period, and wherein the motion data indicates movement of the wearable computing device during the first time period;

responsive to determining that a first energy value based on a first subset of the plurality of motion vectors satisfies a first energy threshold, determine that a particular motion vector from the first subset is a starting motion vector;

responsive to determining that a second energy value based on a second subset of the plurality of motion vectors satisfies a second energy threshold, determine that a particular motion vector from the second subset is an ending motion vector, wherein the first subset includes at least one motion vector from the plurality of motion vectors not included in the second subset, and wherein the second subset includes at least one motion vector from the plurality of motion vectors not included in the first subset; and responsive to determining that a difference between the starting motion vector and the ending motion vector indicates that a user of the wearable computing device is viewing the wearable computing device, cause at least one component of the one or more components to transition from operating in the first power mode to operating in a second power mode, wherein the at least one component consumes more power while operating in the second power mode than while operating in the first power mode.

32. The wearable computing device of claim 31, wherein the at least one module is executable by at least one of the plurality of processors to determine that the difference between the starting motion vector and the ending motion vector indicates that the user of the wearable computing device is viewing the wearable computing device by at least:

determining that a first angle between the starting motion vector and the ending motion vector satisfies a first angular threshold, wherein the starting motion vector is associated with a first time, wherein the ending motion vector is associated with a second time, and wherein the second time is later than the first time;

determining that a time difference between the first time and the second time satisfies a threshold amount of time; and determining that a second angle between a plane parallel to a display of the wearable computing device and a plane perpendicular to a gravity vector satisfies a second angular threshold.

33. A non-transitory computer-readable storage medium storing instructions that, when executed, cause at least one processor of a wearable computing device to:

determine, based on motion data generated by a motion sensor of the wearable computing device, a plurality of motion vectors, wherein one or more components of the wearable computing device are operating in a first power mode during a first time period, and wherein the motion data indicates movement of the wearable computing device during the first time period;

responsive to determining that a first energy value based on a first subset of the plurality of motion vectors satisfies a first energy threshold, determine that a particular motion vector from the first subset is a starting motion vector;

responsive to determining that a second energy value based on a second subset of the plurality of motion vectors satisfies a second energy threshold, determine that a particular motion vector from the second subset is an ending motion vector, wherein the first subset includes at least one motion vector from the plurality of motion vectors not included in the second subset, and wherein the second subset includes at least one motion vector from the plurality of motion vectors not included in the first subset; and responsive to determining that a difference between the starting motion vector and the ending motion vector indicates that a user of the wearable computing device is viewing the wearable computing device, cause at least one component of the one or more components to transition from operating in the first power mode to operating in a second power mode, wherein the at least one component consumes more power while operating in the second power mode than while operating in the first power mode.

34. The non-transitory computer-readable storage medium of claim 33, wherein the instructions that cause the at least one processor to determine that the difference between the starting motion vector and the ending motion vector indicates that the user of the wearable computing device is viewing the wearable computing device comprise instructions that cause the at least one processor to:

determine that a first angle between the starting motion vector and the ending motion vector satisfies a first angular threshold, wherein the starting motion vector is associated with a first time, wherein the ending motion vector is associated with a second time, and wherein the second time is later than the first time;

determine that a time difference between the first time and the second time satisfies a threshold amount of time; and determine that a second angle between a plane parallel to a display of the wearable computing device and a plane perpendicular to a gravity vector satisfies a second angular threshold.

* * * * *